United States Patent
Morris et al.

(10) Patent No.: US 8,540,183 B2
(45) Date of Patent: *Sep. 24, 2013

(54) AEROVEHICLE SYSTEM INCLUDING PLURALITY OF AUTOGYRO ASSEMBLIES

(75) Inventors: John William Morris, Apple Valley, MN (US); Charles A. Jarnot, Milford, KS (US)

(73) Assignee: Heliplane, LLC, Edina, MN (US)

( * ) Notice: Subject to any disclaimer, the term of this patent is extended or adjusted under 35 U.S.C. 154(b) by 290 days.

This patent is subject to a terminal disclaimer.

(21) Appl. No.: 12/966,199

(22) Filed: Dec. 13, 2010

(65) Prior Publication Data

US 2011/0139928 A1    Jun. 16, 2011

Related U.S. Application Data

(60) Provisional application No. 61/285,966, filed on Dec. 12, 2009.

(51) Int. Cl.
*B65D 3/00* (2006.01)
*B65D 47/00* (2006.01)

(52) U.S. Cl.
USPC ........................................................ 244/1 TD

(58) Field of Classification Search
USPC .................. 244/17.23, 17.27, 135 A, 135 R, 244/1 TD, 2, 3, 8, 17.11, 17.25, 39, 190, 244/194, 195, 108
See application file for complete search history.

(56) References Cited

U.S. PATENT DOCUMENTS

| | | |
|---|---|---|
| 1,017,200 A | 2/1912 | Brackett |
| 1,590,497 A | 6/1926 | De La Cierva |

(Continued)

FOREIGN PATENT DOCUMENTS

| | | | |
|---|---|---|---|
| GB | 2129382 A | | 11/1982 |
| GB | 2129382 A | * | 5/1984 |
| WO | WO 2008/085547 A2 | | 7/2008 |
| WO | WO 2009/054015 A1 | | 4/2009 |

OTHER PUBLICATIONS

Judy Duncan, SnowGoose Bravo UAV, Mar. 30, 2009, <http://thefutureofthings.com/pod/6761/snowgoose-bravo-uav.com>.*
Chuck Jarnot, Airtrailer; Heliplane LLC; Oct. 14, 2009.*

(Continued)

*Primary Examiner* — Tien Dinh
*Assistant Examiner* — Michael A Fabula
(74) *Attorney, Agent, or Firm* — Benjamin C. Armitage; Billion & Armitage

(57) ABSTRACT

An unmanned, towable aerovehicle is described and includes a container or frame to hold or support cargo, at least one and, in some examples, a plurality of autogyro assemblies connected to the container and to provide flight characteristics, and a controller to control operation the autogyro assembly for unmanned flight. The container or frame includes a connection to connect to a powered aircraft to provide forward motive force to power the autogyro assembly. In an example, the autogyro assembly includes a mast extending from the container, a rotatable hub on an end of the mast, and a plurality of blades connected to the hub for rotation to provide lift to the vehicle. In an example, an electrical motor rotates the blades prior to lift off to assist in take off. In an example, the electrical motor does not have enough power to sustain flight of the vehicle. The aerovehicle can further include plurality of autogyro assemblies to assist in flight. The aerovehicle can include surfaces that provide lift or control to assist in the flight profile of the aerovehicle.

25 Claims, 20 Drawing Sheets

(56) References Cited

U.S. PATENT DOCUMENTS

| | | | |
|---|---|---|---|
| 1,838,327 A * | 12/1931 | Salisbury et al. | 416/117 |
| 1,875,891 A * | 9/1932 | Salisbury et al. | 244/6 |
| 1,947,901 A | 2/1934 | De La Cierva | |
| 1,977,834 A | 10/1934 | Pitcairn | |
| 2,181,477 A | 11/1939 | Chupp | |
| 2,298,912 A | 10/1942 | Alabrune | |
| 2,344,967 A * | 3/1944 | Bennett | 244/17.23 |
| 2,352,342 A | 6/1944 | Pitcairn | |
| 2,373,086 A | 4/1945 | Alabrune | |
| 2,425,309 A | 8/1947 | Ennis | |
| 2,429,502 A | 10/1947 | Young | |
| 2,442,846 A | 6/1948 | Dunn | |
| 2,453,139 A | 11/1948 | Kleinkort | |
| 2,472,290 A | 6/1949 | Fernstrum | |
| 2,520,620 A * | 8/1950 | Ashwood | 244/3 |
| 2,894,763 A | 7/1959 | Krnath et al. | |
| 2,995,740 A | 8/1961 | Shreckengost | |
| 3,857,194 A | 12/1974 | Guttman | |
| 4,154,017 A | 5/1979 | Bilardi et al. | |
| 4,161,843 A | 7/1979 | Hui | |
| 4,233,605 A * | 11/1980 | Coleman | 342/6 |
| 4,416,436 A | 11/1983 | Wilson, Jr. | |
| 4,730,795 A | 3/1988 | David | |
| 5,115,997 A | 5/1992 | Peterson | |
| 5,188,313 A * | 2/1993 | Piasecki | 244/3 |
| 5,301,900 A | 4/1994 | Groen | |
| 5,381,988 A | 1/1995 | Kattas | |
| 5,544,844 A | 8/1996 | Groen | |
| 5,626,310 A | 5/1997 | Kelly | |
| 5,996,934 A * | 12/1999 | Murph | 244/17.25 |
| 6,029,928 A | 2/2000 | Kelly | |
| 6,089,501 A * | 7/2000 | Frost | 244/8 |
| 6,220,543 B1 | 4/2001 | Uskolovsky | |
| 6,422,506 B1 | 7/2002 | Colby | |
| 6,542,109 B2 * | 4/2003 | Lloyd et al. | 342/14 |
| 6,691,950 B2 | 2/2004 | Salesse-Lavergne | |
| 6,874,729 B1 | 4/2005 | McDonnell | |
| 7,109,598 B2 | 9/2006 | Roberts et al. | |
| 7,125,175 B2 | 10/2006 | Hill | |
| 7,161,131 B2 | 1/2007 | Kimber | |
| 7,176,831 B2 | 2/2007 | Dibble et al. | |
| 7,183,663 B2 | 2/2007 | Roberts et al. | |
| 7,259,713 B1 | 8/2007 | Matich et al. | |
| 7,438,259 B1 | 10/2008 | Piasecki et al. | |
| 7,578,479 B1 * | 8/2009 | Colich et al. | 244/137.4 |
| 7,604,197 B2 | 10/2009 | Lye et al. | |
| 7,677,491 B2 * | 3/2010 | Merems et al. | 244/8 |
| 7,775,483 B2 | 8/2010 | Olson | |
| 7,900,866 B2 | 3/2011 | Kutzmann et al. | |
| 8,115,665 B2 | 2/2012 | Zahavi | |
| 8,262,015 B2 | 9/2012 | Kuroda et al. | |
| 2002/0109045 A1 * | 8/2002 | Beach et al. | 244/33 |
| 2002/0190162 A1 | 12/2002 | McDonnell | |
| 2003/0024453 A1 * | 2/2003 | Fonda | 114/39.21 |
| 2003/0066926 A1 | 4/2003 | Salesse-Lavergne | |
| 2003/0136874 A1 | 7/2003 | Gjerdrum | |
| 2004/0075018 A1 | 4/2004 | Yamane | |
| 2007/0029439 A1 * | 2/2007 | Merems et al. | 244/7 R |
| 2007/0176432 A1 | 8/2007 | Rolt | |
| 2008/0316125 A1 | 12/2008 | Marrocco et al. | |
| 2009/0081043 A1 | 3/2009 | Jones | |
| 2009/0118875 A1 | 5/2009 | Stroud | |
| 2009/0174596 A1 | 7/2009 | Gekat | |
| 2009/0206195 A1 * | 8/2009 | Colich et al. | 244/39 |
| 2010/0012769 A1 * | 1/2010 | Alber et al. | 244/17.23 |
| 2010/0013236 A1 | 1/2010 | Carroll | |
| 2010/0230546 A1 | 9/2010 | Bevirt | |
| 2010/0308174 A1 | 12/2010 | Calverley | |
| 2011/0139928 A1 | 6/2011 | Morris et al. | |
| 2011/0186687 A1 * | 8/2011 | Elder | 244/155 A |
| 2011/0222047 A1 | 9/2011 | Guetta et al. | |
| 2011/0266809 A1 | 11/2011 | Calverley | |
| 2011/0315810 A1 | 12/2011 | Petrov | |
| 2012/0091259 A1 * | 4/2012 | Morris et al. | 244/17.13 |
| 2012/0104763 A1 | 5/2012 | Lind | |
| 2012/0112008 A1 | 5/2012 | Holifield et al. | |

OTHER PUBLICATIONS

Hafner Rotabuggy, Wikipedia, <http://en.wikipedia.org/wiki/Hafner_Rotabuggy> Jul. 2003.*
Raymond Brown et al.; Double Gyroplane Has Speed and Power; Popular Science; Aug. 1934; p. 47.*
Wilson et al., "New concept for low cost VTOL cargo delivery capability," Guidance and Control Conference, Gatlinburg, TN: Aug. 15-17, 1983; Collection of Technical Papers (A83-41659 19-63); New York, American Institute of Aeronautics and Astronautics, 1983, pp. 324-335.
Flight International, "US Navy considers hybrid UAV designs," Reed Business Information, Sutton Surrey, GB, Mar. 28, 2000, vol. 157, No. 4721: 22.
McPhee, A., "Unreal aircraft," <http://www.unrealaircraft.com/qbranch/rotachut.php> Jan. 1, 2003, 2 pgs.
Charnov, B.H., "Histroy of gyroplanes, autogiro to gyroplane: 1923-2003," Groen Brothers Aviation, Inc., Oct. 30, 2006, 8 pgs. <http://www.groenbros.com/history.php>.
Electronic Warfare Manual; Joint Publication 3-13; Jan. 25, 2007.
International Search Report for related International Application No. PCT/US2010/035887, mailed on Sep. 13, 2010.
Written Opinion for related International Application No. PCT/US2010/035887, mailed on Sep. 13, 2010.
Williams et al., "Dynamics of towed payload system using multiple fixed-wing aircraft," J. Guidance, Control, and Dynamics (2009) 32 (6): 1766-1780.

* cited by examiner

AEROVEHICLE SYSTEM INCLUDING PLURALITY OF AUTOGYRO ASSEMBLIES

RELATED APPLICATION

The present application claims priority under 35 U.S.C. §119(e) to U.S. Provisional Patent Application No. 61/285,966, filed Dec. 12, 2009, which is hereby incorporated by reference in its entirety for any purpose.

FIELD

The present disclosure related to an aerovehicle, and more particularly, to an unmanned autogyro that can be used as a towed air vehicle and as a self controlled aircraft.

BACKGROUND

An autogyro aircraft is piloted by a person and derives lift from an unpowered, freely rotating rotary wing or plurality of rotary blades. The energy to rotate the rotary wing results from the forward movement of the aircraft in response to a thrusting engine such as an onboard motor that drives a propeller. During the developing years of aviation aircraft, autogyro aircraft were proposed to avoid the problem of aircraft stalling in flight and to reduce the need for runways. The relative airspeed of the rotating wing is independent of the forward airspeed of the autogyro, allowing slow ground speed for takeoff and landing, and safety in slow-speed flight. Engines are controlled by the pilot and may be tractor-mounted in front of the pilot or pusher-mounted behind the pilot on the rear of the autogyro. Airflow passing the rotary wing, which is tilted upwardly toward the front of the autogyro, provides the driving force to rotate the wing. The Bernoulli Effect of the airflow moving over the rotary wing surface creates lift.

U.S. Pat. No. 1,590,497 issued to Juan de la Cierva of Madrid, Spain, illustrated a very early embodiment of a manned autogyro. Subsequently, de la Cierva obtained U.S. Pat. No. 1,947,901 which recognized the influence of the angle of attack of the blade of a rotary wing. The optimum angle of attack for the blades or rotary wing was described by Pitcairn in U.S. Pat. No. 1,977,834 at about the same time. In U.S. Pat. No. 2,352,342, Pitcairn disclosed an autogyro with blades which were hinged relative to the hub.

Even though the principal focus for low speed flight appears to have shifted to helicopters, there appears to have been some continuing interest in autogyro craft. However, development efforts appear to have largely been restricted to refinements of the early patented systems. For instance, Salisbury, et al., U.S. Pat. No. 1,838,327, showed a system to change the lift to drag response of a rotary wing.

DETAILED DESCRIPTION

Figure 1:
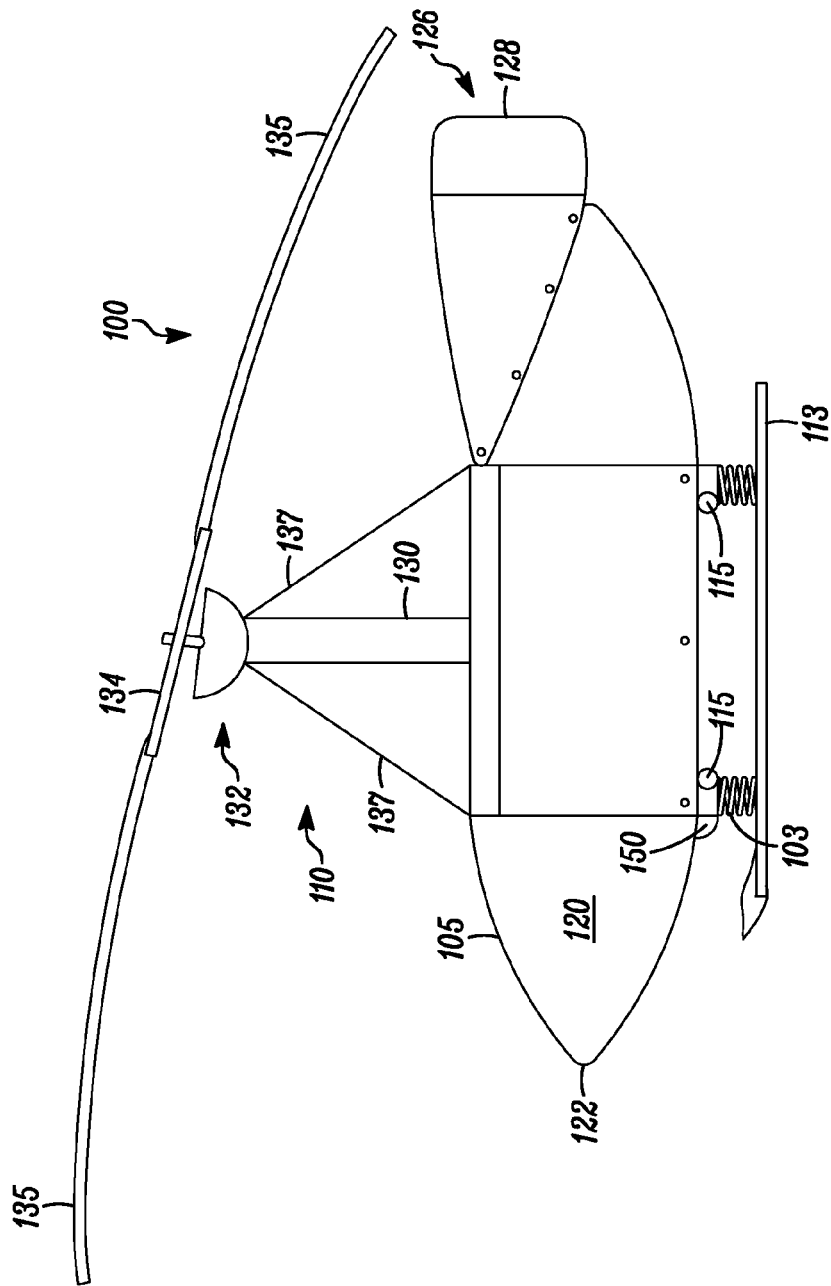
FIG. 1 is a side view of an aerovehicle according an example of the present invention.

The present inventors have recognized the need for more efficient delivery of cargo. Modern commerce and military plans require efficient delivery of needed supplies, equipment, and parts. However, air delivery is limited by the weight and bulk that a given aircraft can carry. For example, a Cessna 172 with a single pilot can carry a payload of 400 lb. or 30 cubic feet; a Cessna 182 with a single pilot can carry a payload of 500 lb. or 32 cubic ft.; a Caravan 650 Super Cargomaster with a two pilot can carry a payload of 2,500 lb. or 451 cubic ft. Helicopters also have limited cargo capacity: a Robinson 44 with a single pilot can carry a maximum payload of 500 lb. in 25 cubic ft.; a Robinson 22 with a single pilot can carry a maximum payload of 200 lb. in 16 cubic ft.; a Bell 206B with a single pilot can carry a maximum payload of 700 lb. in 30 cubic ft. Much of a helicopter's cargo capacity, either weight or volume, is taken up by a heavy engine and heavy transmission, tail rotor assembly, etc. Moreover, such a delivery method is expensive as operating costs of a manned aircraft are quite high. With the above problem recognized, the inventors developed an unmanned aircraft that can deliver cargo in an efficient manner, e.g., more inexpensive per trip, per weight, and/or by volume. A towable aerovehicle was developed, by the present inventors, that includes an autogyro, and hence its own lift. The aerovehicle can act as a trailer to a powered aircraft. The present vehicle can carry cargo that is at least 100% of the volume that the towing aircraft can carry. Examples of the presently described vehicle can further carry about 75% or more of the weight of the cargo of the towing aircraft.

Using autogyro technology with an on-board automated control system, the vehicle can fly safely behind a towing aircraft. In an example, the control system can automatically land the vehicle. In another example, the control system can sense various flight and aerovehicle characteristics and automatically control the settings of the aerovehicle, including the autogyro for different phases of flight, e.g., takeoff, towed flight, free flight, and landing.

In an aspect of the present invention, an aerovehicle includes three components, namely, a container to hold cargo, an autogyro assembly connected to the container and to provide flight characteristics, and a controller to control operation of the autogyro assembly for unmanned flight, which can include takeoff, towed flight, free flight, and landing. The container includes a connection to connect to a powered aircraft to provide forward motive force to power the autogyro assembly. In an example, the autogyro assembly includes a mast extending from the container, a rotatable hub on an end of the mast, and a plurality of blades, connected to the hub, for rotation to provide lift to the vehicle. The autogyro assembly can include a rotor shaft position sensing system. In an example, an electrical pre-rotor rotates the blades prior to lift off to assist in take off. The electrical pre-rotor does not have enough power to sustain flight of the vehicle. The container supports sensor systems that can be adapted to indicate load, weight and balance of the cargo supported by the container. In an example, the sensor system can be an airspeed indicator sensor. The sensor system can include a position sensing system. The sensor system can include Pitot sensors, which sense the air speed.

The controller can sense various flight characteristics and process the sensed data to control the rotational speed of the hub or blades, angle of attack of the hub and plurality of rotating blades, and the pitch of the blades. In an example, the controller senses forward motion, e.g., velocity or acceleration, to control the autogyro assembly. In an example, the controller can receive signals from remote transmitters, e.g., a land based transmitter or from the towing aircraft. The controller can adjust components of the autogyro assembly using the received signal. In an example, the controller outputs blade pitch control signals to operate actuators that set the angle of blades. In an example, the controller outputs control signals to operate actuators that control the position of at least one of vertical stabilizers and horizontal stabilizers.

The container encloses a volume within a body to hold cargo. The body is defined by a frame on which a skin is fixed. An undercarriage is provided that contacts the ground for landings and takeoffs. A rear stabilizer is provided to improve the flight characteristics of the aerovehicle. In an example, the undercarriage includes a trolley that contacts the ground to provide mobility and is removable from rest of the container.

Figure 2:
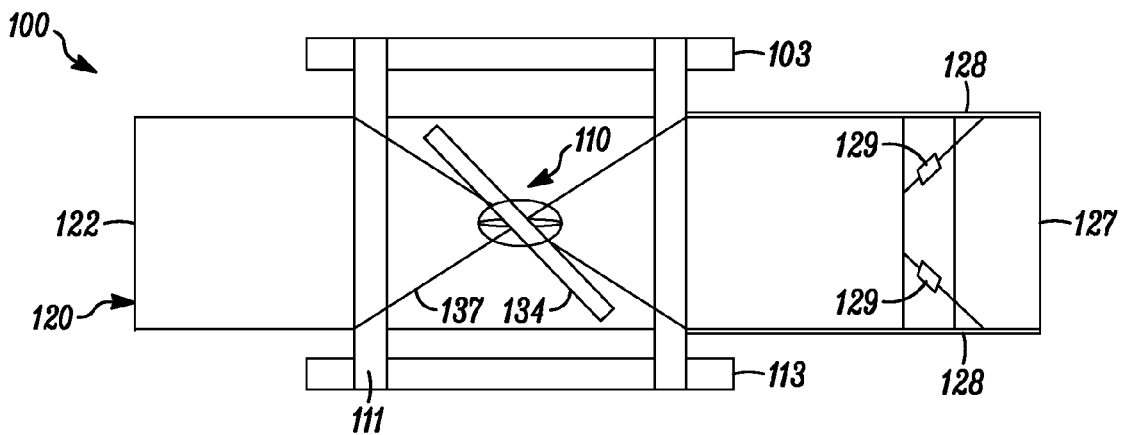
FIG. 2 is a top view of an aerovehicle according an example of the present invention.
Figure 3:
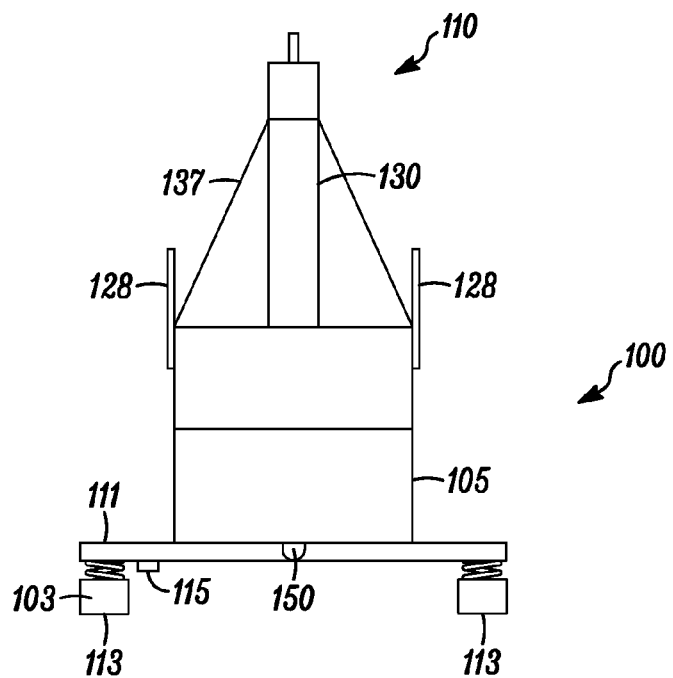
FIG. 3 is a front view of an aerovehicle according an example of the present invention.

FIGS. 1, 2, and 3A show a side view, a top view, and a front view of an unmanned aerovehicle 100. The unmanned aerovehicle 100 is an autogyro vehicle that flies based at least in part on the lift created by rotating airfoil blades. The operating principal is the same as a fixed wing airplane with the airfoil blades rotating. The aerovehicle 100 includes an undercarriage 103 on which is supported a container 105 and autogyro assembly 110. The undercarriage 103 is to contact the ground and support the container 105. The undercarriage 103 as shown includes a frame 111 on which are mounted mobility devices 113 that contact the ground and allow the vehicle 100 to move on the ground. The mobility devices 113 can include wheels, pontoons, and/or skis (as shown). The frame 111 supports the container 105. In a further example, the undercarriage 103 is releasably mounted to a trolley on which is mounted mobility device(s). The undercarriage 103 can further include a plurality of supports 114, e.g., cross members at the front and rear of the container 105 from which legs extend downwardly from the container. The mobility devices 113 are fixed at the downward ends of the legs. Supports 114 can include sensors 115 that measure the weight or displacement at each of the legs. Sensors 115 communicate the sensed data to the controller, e.g., controller 401.

The container 105 is shown as an enclosed body 120 that defines an interior volume in which cargo can be stored. In an example, the container 105 includes a platform on which cargo is stored. The body 120 can be fabricated out of wood, composites, carbon fiber, plastic, or lightweight metal such rigid materials can form a frame on which a skin is fixed. The wood body can be a limited use body, e.g., one-time use. The container 105 can have a high strength internal frame with a lightweight skin fixed thereto. The skin can be a fabric, a thin plastic, a carbon fiber fabric, or a thin, lightweight metal skin. The enclosed body 120 has essentially smooth outer surfaces and a narrowed, leading nose 122. The body can further be a monocoque design, whereby the external skin supports the structural load. In an example, the body has a semi-monocoque design in which the body is partially supported by the outer skin and may have some frame elements that also support the structural load. The body 120 can further include doors that can be opened for loading and securely closed during flight. The doors can be positioned on the sides, in the nose, or in the tail.

A stabilizer system 126 is on the body 120 to assist in flight. Here as shown, the stabilizer system is a rear stabilizer. The rear stabilizer 126 includes a central horizontal tailplane 127, which can include an elevator that is moveable vertically by an actuator, which is controlled by the controller, and a vertical fin 128 is mounted to a respective end of the tailplane 127. The vertical fins 128 can be fixed. In an example, the vertical fins 128 are connected to actuators 129 that move the vertical fins horizontally in response to signals from the controller. The horizontal tailplane 127 is spaced from the rear of the body 120 such that a gap is between the rearward edge of the body 120 and the leading edge of the tailplane 127. It will be recognized that the stabilizer system 126 can be shaped or designed to better stabilize the vehicle based on the various shapes of the body, loads it will carry, towing power of the towing aircraft, and turbulence. The stabilizer system 126 can be positioned to best aid in stable flight of the vehicle 100. In various example, the stabilizer system can include a T-tail, J-tail, V-tail, cruciform tail, twin tail, among others.

In an example, a container 105 that can be towed by Cessna 172, Super Cub, or other similar aircraft, can hold about 1,000 lbs (+/−100 lbs.) of cargo in a volume of about 154 cubic ft. (+/−10 cubic feet). The cargo volume of the container store cargo of a maximum length of about 12 ft. (+/− one foot). In this example, the body 120 has a length, nose to rear of 18.5 feet and a height of 5 feet. The rear stabilizer 126 extends partly onto the body and is attached thereto by a plurality of connections on each of the vertical fins 128. The rear stabilizer 126 adds about two feet onto the length of the vehicle.

The container 105 further includes a connection 150 at which a tow line (not shown in FIG. 1, 2, or 3A) can be attached so that a tug aircraft can provide motive force to the vehicle 100. In an example, the connection 150 can be a glider tow connection. Examples of a glider tow connection can be found in U.S. Pat. Nos. 2,425,309; 2,453,139; 2,520,620; 2,894,763 which is incorporated herein by reference for any purpose. However, if any of these incorporated patents conflict with any of the present disclosure, the present disclosure controls interpretation. One example of a tow connection 150 is a hook mounted on the front of the vehicle 100, e.g., on the container 120 or the frame 103. A similar connection can be on the rear of the tug or towing aircraft. In an example, the hook is on the bottom of the tug aircraft, e.g., on the tailwheel structure or on the bottom of the fuselage. Examples of hook include Schweizer hitch, Tost hitch, and Ottfur hook. The hook is to hold an end of the tow line, for example, a ring fixed to an end of the tow line. On the tug aircraft the hook is open toward the front of the aircraft and the ring and tow line extend rearward from the tug aircraft. A release mechanism allows a person in the aircraft to release the ring from the hook by moving the hook so that it opens from the tow position to a release position such that the hook is open more rearward than the tow position. The release mechanism can be linkage connected by a release line to the pilot who can change position of the hook by moving a lever connected to the release line. The same mechanisms, e.g., hook, and release mechanism, are mounted on the vehicle 100. The hook on the vehicle 100 is open rearward so that the tow line is secure during flight. The tow line and/or the rings can have a weak link that will fail if the forces between the vehicle and the tug aircraft are too great. These weak links are designed to fail and release the vehicle 100 if a force between the tug aircraft and the vehicle may result in catastrophic failure for either the vehicle or the tug aircraft.

The tow line between the tug aircraft and the vehicle 100 can provide electrical power from the tug aircraft to the vehicle 100. In an example, the tow line can further provide bidirectional communication between the tug aircraft and the vehicle 100, in particular to the vehicle controller.

The autogyro assembly 110 is fixed to a central location on the body 105. The autogyro assembly 110 includes an upwardly extending mast 130. A hub 132 is rotatably mounted on the upward end of the mast 130. The hub 132 supports a plurality of blade supports 134 on which airfoil blades 135 are mounted. The blades are shown in FIG. 1 and not FIGS. 2 and 3 for clarity. The blades 135 can be manufacture from aluminum, honeycombed aluminum, composite laminates of resins, fiber glass, and/or other natural materials, and/or carbon fiber. The blade supports 134, and hence, blades, are provided in opposed pairs. In an example, the blades are an equal number of opposed pairs of blades. In an example, the number of blades is four (two pairs of opposed blades). In an example, the blades can be of any number of blades that are spaced in the plane of rotation. In an example, three blades are provided and are spaced about 120 degrees from each other. The airfoil blades 135 have a cross sectional shape that resembles an airplane wing to provide lift during flight. The autogyro assembly 110 includes actuators that control the rotational position of the blades 135. Stanchions or guide wires 137 extend from the body 105 to the top of the mast 130 to stabilize the mast during flight and from the forces exerted thereon by the rotation of the hub 132 and blades 135.

The airfoil blades 135 can be retracted to be adjacent the hub or removed from the hub 132 for further transport of the vehicle or recovery of at least some components of the vehicle. In an example, the airfoil blades 135 are removed from the hub 134 and are single elongate bodies. These bodies can be made from metal, natural composites, wood, carbon fiber layers, resins, plastics, or semisynthetic organic amorphous solid materials, polymers, and combinations thereof. The blades 135 can then be transported back to an airfield and reused on a different autogyro assembly. In an example, the blades 135 from a plurality of vehicles are stored in one of the vehicles for a return flight from its mission location to a home airfield. In this example, only one of the vehicles 100 need be flown from its destination to retrieve the more costly parts of other vehicles. Other components such as the controller, sensors, and hub can also be removed from vehicles that will not be recovered and stored in a vehicle that will be recovered.

In an example, the airfoil blades 135 are foldable such that they have an extended position for flight and a retracted position for non-flight. An example of retractable airfoil blades is described in U.S. Patent Publication No. 2009/0081043, which is incorporated herein by reference for any purpose. However, if U.S. Patent Publication No. 2009/0081043 conflicts with any of the present disclosure, the present disclosure controls interpretation. Thus, during ground transportation or during other non-flight times the blades 135 are retracted such that the airfoil blades do not interfere with ground crews or experience forces on the blades during ground movement.

The airfoil blades 135 have at least one section that has an airfoil profile. This section of the blade 135 has a shape when viewed in cross-section that has a rounded leading edge and a sharp, pointed trailing edge. A chord is defined from the leading edge to the trailing edge. The chord asymmetrically divides blade into an upper camber and a lower camber. The upper camber is greater than the lower camber. Moreover, the upper and lower cambers can vary along the length of the section and entire airfoil blade. The airfoil blade moves through the air and the passage of air over the blade produces a force perpendicular to the motion called lift. The chord defines the angle of attack for that section of the blade. The angle of attack can be defined as the angle between the chord and a vector representing the relative motion between the aircraft and the atmosphere. Since an airfoil blade can have various shapes, a chord line along the entire length of the airfoil blade may not be uniformly definable and may change along the length of the blade.

Figure 4A:
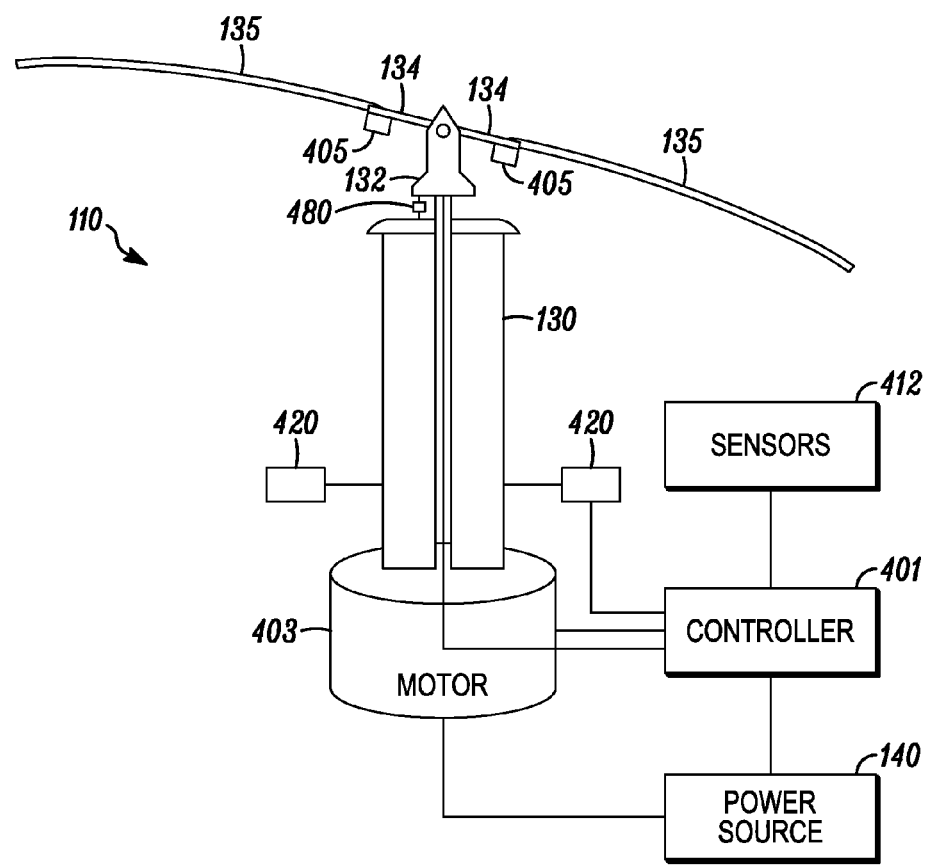
FIG. 4A is a schematic view of components of an aerovehicle according to an example of the present invention.

FIG. 4A shows a schematic view of the autogyro assembly 110, which includes the mast 130, hub 132, blade supports 134, and airfoil blades 135. The autogyro assembly 110 further includes a controller 401, an electrical motor 403, a plurality of actuators 405, and a power source 410 connected to each device in need of electrical power. The controller 401 is in communication with the electrical motor 401 and actuators 405 to control operation thereof. The controller 401 can further communicate with sensors 412 to receive performance data that can be used to control components of the autogyro assembly. In an example, the controller 401 controls operation of various moveable components such that the vehicle 100 flies unmanned. In this example unmanned means that there is no human being on board the vehicle 100.

The controller 401 controls operation of the electrical motor 403 that rotates a drive shaft connected to the hub 132 to rotate the airfoil blades 135. The motor 403 adds rotational power to the rotor system to reduce drag and assist in the lift provided by the airfoil blades 135. The motor 403, in an example, does not provide sufficient power to sustain flight of the aerovehicle 100. In an example, the motor 403 can provide sufficient power to the rotating airfoil blades 135 such that the vehicle 100 can launch the vehicle in a cargo-free state. The motor 403 can further provide rotational power that can be used to reduce blade angle of attack, prevent rotor decay of RPM speed, improve landing glide slope and decrease the decent speed. These features may be described in greater detail with regard to operational of the vehicle, e.g. FIGS. 6-9.

The controller 401 controls operation of the actuators 405, which control the tilt of the airfoil blades 135. During prerotation of the blades 135 prior to takeoff, the actuators 135 hold the blades in a flat position that has a very low angle of incidence, e.g., 0 degrees, less than 5 degrees, or less than 10 degrees. Prerotation is the rotation of the airfoil blades prior to take off or rotation of the blades by the onboard motor. Once the blades 135 are at a desired rotational speed, the actuators 405 can drive the blades to a takeoff position with an angle of incidence greater than the prerotation, flat position and a flight position. Once the vehicle 100 is in flight, the actuators 405 can reduce the angle of incidence relative to the takeoff angle to the flight position. The flight position of the actuators 405 and blades 135 is greater than the prerotation position. In another example, the actuators 405 release the blades 135 during flight so they can find the optimum angle of incidence without influence by the actuators 405.

In a flight profile of the vehicle 100, the flat, prerotation position of the blades 135 results in a zero angle of incidence to reduce drag on the blades during prerotation such that a smaller motor and power source can be used. At takeoff, the blades 135 are set at an angle of incidence of about 12 degrees. Each of the degree measurements in this paragraph can be in a range of +/− one degree. During flight, the blades 135 are set at an angle of incidence of about 5 degrees. During the approach, the blades 135 are set at an angle of incidence of about 12 degrees. During the landing the blades 135 are set at an angle of incidence of about 20 degrees or more.

The aerovehicle 100 can result in a 50% increase or more in cargo capacity relative to the towing aircraft. In an example, the vehicle 100 can tow about half of the gross weight of the towing aircraft. In some examples, the aerovehicle 100 results in a 75% to 100% increase in cargo capacity with cargo capacity measured by weight. A further benefit is the aerovehicle having a body that can hold larger, either in length, width, or height than the towing aircraft as the vehicle 100 does not have all of the design constraints that a manned aircraft must have.

An actuator 420 is connected to the mast 130 to move the mast longitudinally and laterally to correct for unbalanced loads in the container. In an example, there is a plurality of actuators 420, which can be screw jacks that are electrically powered. Load sensors, e.g., sensors 115, sense the deflection of container on the frame and feed this data to the controller 401. The controller 401 calculates the load positioning, including empty weight (for different vehicle 100 configurations) and center of gravity. The controller 401 can indicate to the ground crew how much more cargo, by weight, the vehicle can safely fly. The controller 401 further calculates the center of gravity based on data from the load sensors. The controller can engage the actuator(s) 420 to move the autogyro assembly 110 forward and aft, and left or right to keep the mast and hub, and hence the point of rotation of the blades, as close to the center of gravity as possible. In an example, the actuators 420 are jack-screws that precisely position the mast 130. If the autogyro assembly 110 cannot be moved to sufficiently to center the autogyro assembly 110, e.g. mast and hub, at the center of gravity, then the controller 401 will issue an error message to the ground crew. Messages to the ground crew can be displayed on video display 510, stored in memory 504 or 506 or sent view network interface device 520 over a network 526 to other devices, e.g., handheld devices, for display.

Figure 4B:
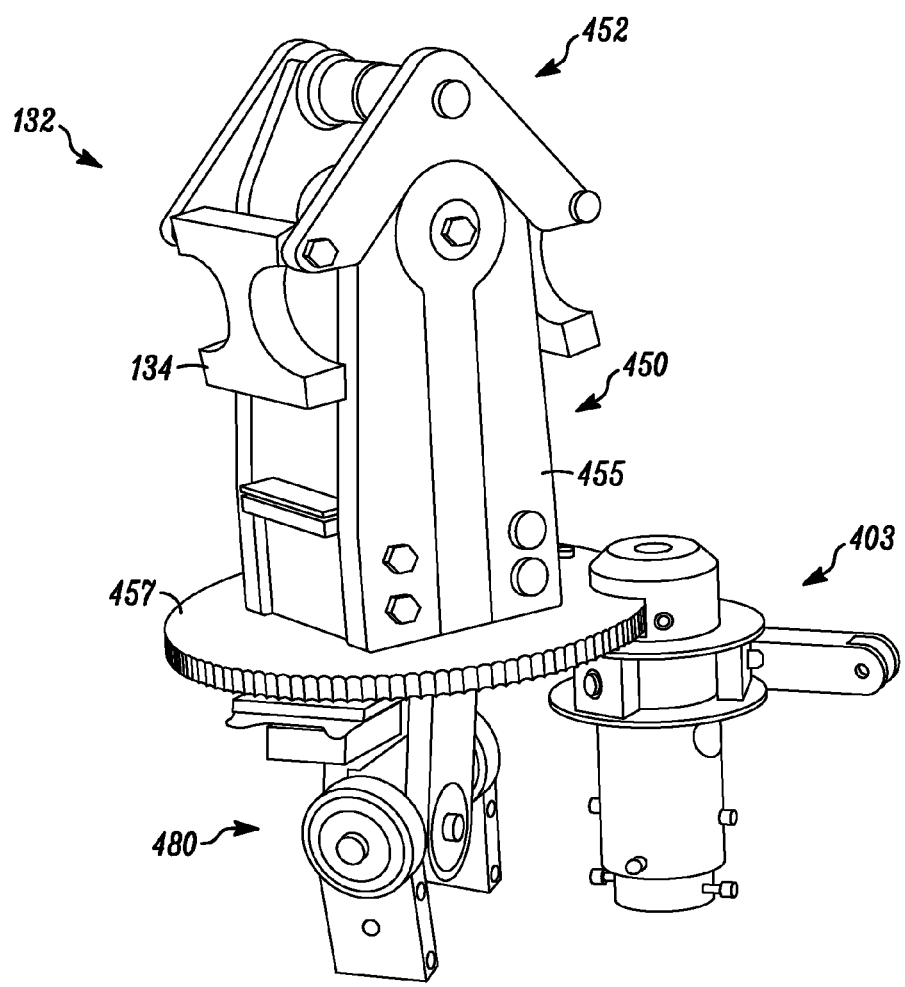
FIG. 4B is a schematic view of components of an aerovehicle according to an example of the present invention.

Referring now to FIG. 4B, an example hub 132 is shown that includes a main body 450 that includes top 452 that defines an opening in which the airfoil blades 136 or blade supports 134 are fixed. Shock bumpers 455 engage the top of the airfoil blades 136 or blade supports 134 in the body 450 to prevent mast bumping. In an example, the body 450 is fixed to a drive gear 457 that can be engaged by the motor 403 through a drive shaft 458 or manually to rotate the hub body 450 and the blades attached thereto. In another example, the main body 450 is fixed on a universal joint 460 that can be fixed to a drive shaft that extends in the mast from the motor 403 to the hub 132. In another example, the main body 450 and drive gear 457 rotate on the joint 460. The joint 460 allows the main body 450 to be tilted vertically such that the airfoil blade is tilts downwardly from the front to the back to create and angle of incidence. An actuator 480 controls the amount of tilt of the airfoil blades. The controller 401, based on its application of its stored rules and the sensor inputs, sends signals to the actuator 480 to control the angle of incidence of the airfoil blades. In an example, the actuator 480 is positioned at the front of the hub 132. Thus, the actuator 480 controls the pivot of the hub on axis 482.

In a further example, the hub 132 can provide fully articulated movement such than the plane of blades can be moved in three degrees of movement, pitch, roll and yaw. The pitch of the individual blades can also be changed. In a further example, the pitch of the blades is fixed and the hub 132 is moved in three degrees of freedom (pitch, roll and yaw), sometimes referred to as a teetering system. In an example, the hub 132 can control only the pitch of the plane of the blade rotation.

Figure 5A:
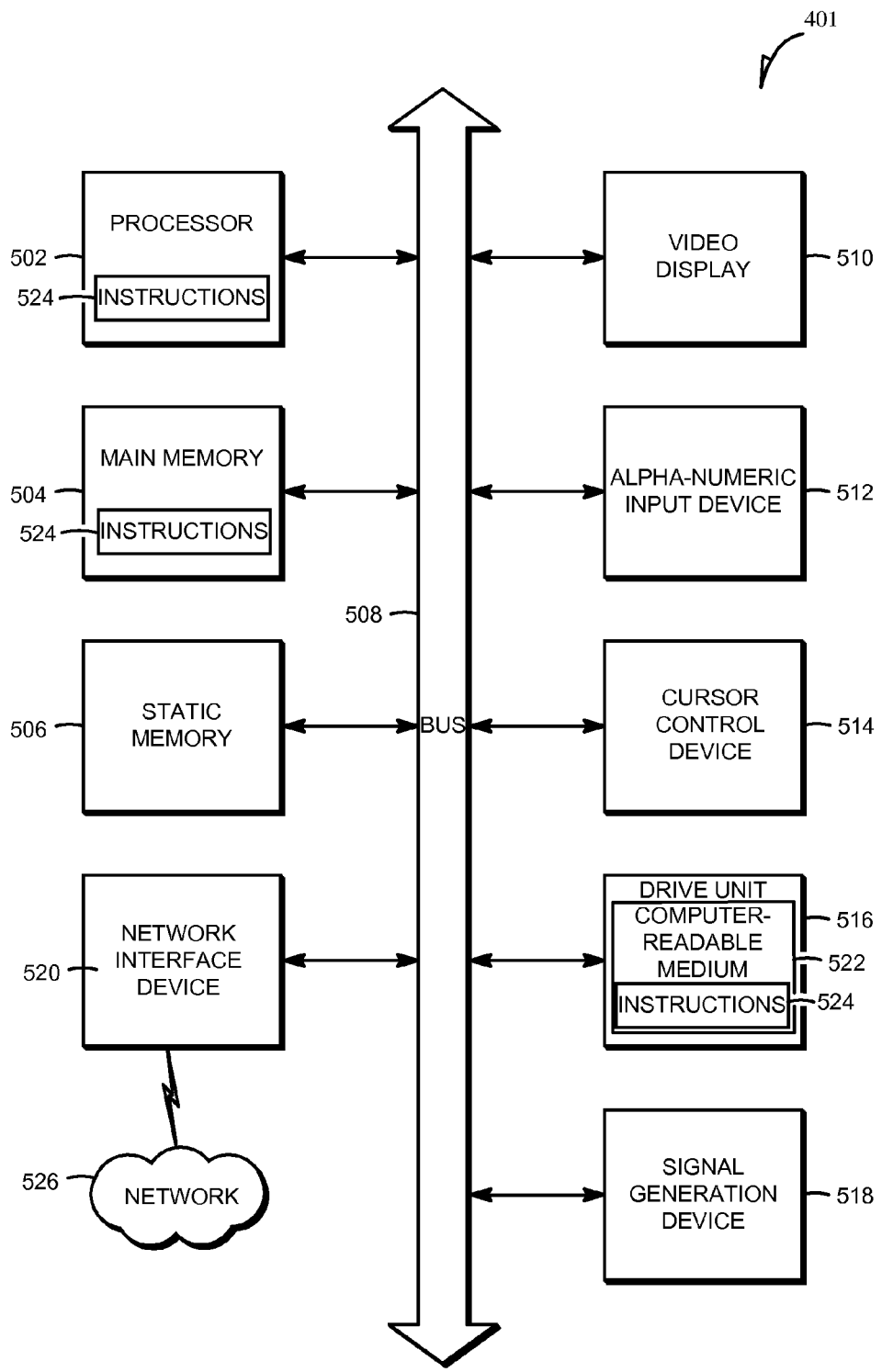
FIG. 5A is a schematic view of a controller for the aerovehicle according to an example of the present invention.

FIG. 5A shows an example of the controller 401 within which a set of instructions are be executed causing the vehicle 100 to perform any one or more of the methods, processes, operations, or methodologies discussed herein. In an example, the controller 401 can include the functionality of the computer system. The controller can control the position of the hub 132, when the hub is pitch only movement hub. The controller 401 can provide more complex control signals to the hub when the hub is a teetering system or a teetering system with pitch control for the blades as well.

In an example embodiment, the controller 401 operates as a standalone device or may be connected (e.g., networked) to other controllers. In a networked deployment, the one controller can operate in the capacity of a server (master controller) or a client in server-client network environment, or as a peer machine in a peer-to-peer (or distributed) network environment. Further, while only a single controller is illustrated, the term "controller" shall also be taken to include any collection of devices that individually or jointly execute a set (or multiple sets) of instructions to perform any one or more of the methodologies discussed herein.

The example controller 401 includes a processor 502 (e.g., a central processing unit (CPU) or application specific integrated chip (ASIC)), a main memory 504, and a static memory 506, which communicate with each other via a bus 508. The controller 401 can include a video display unit 510 (e.g., a liquid crystal display (LCD) or a cathode ray tube (CRT)). The controller 401 also includes an alphanumeric input device 512 (e.g., a keyboard), a cursor control device 514 (e.g., a mouse), a storage drive unit 516 (disk drive or solid state drive), a signal generation device 518 (e.g., a speaker), and an interface device 520.

The drive unit 516 includes a machine-readable medium 522 on which is stored one or more sets of instructions (e.g., software 524) embodying any one or more of the methodologies or functions described herein. The software 524 can also reside, completely or at least partially, within the main memory 504 and/or within the processor 502 during execution thereof by the controller 401, the main memory 504 and the processor 502 also constituting machine-readable media. The software 524 can further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by a computer or computing device such as controller 401, the machine and that cause the machine to perform any one or more of the methodologies shown in the various embodiments of the present invention. The term "machine-readable medium" shall accordingly be taken to include, but not be limited to, solid-state memories, optical and magnetic media, and carrier wave signals.

The interface device 520 is further configured to receive radio frequency signals. These signals can trigger certain operations to be commanded by the controller 401. In an example, a signal can be sent from the motive unit, such as an airplane or a helicopter and received by the interface device 520.

The controller 401 executes flight control instructions without the need for an on-board pilot. The controller 401 includes multiple flight rules for different phases of flight, i.e., takeoff, cruise, unaided flight, and landing phases. The controller 401 controls the pitch for each of these different phases by data from the sensors and applying this data using the flight control instructions. Pitch is the position of the plane in which the blades travel relative to a horizontal plane (essentially parallel to the ground).

The controller 401 can further store data and instructions for autonomous return flight. The controller 401 can store the weight of vehicle 100 absent cargo. As the cargo can be up to about 80% of the gross weight of the vehicle 100 during a delivery flight, it is envisioned that the motor 403 may be able to rotate the blades 136 to achieve take-off. In an example, the vehicle 100 is positioned so that it faces into a headwind. The headwind provides a relative forward windspeed against the airfoil blades 136. The controller 401 instructs the motor to rotate the blades and the vehicle can be airborne. Another example of self flight is described below with reference to FIG. 11, which can be used in conjunction with the present example. Once airborne, the controller 401 can sense the position of the vehicle 100, for example, using a global navigation satellite system (GNSS) such as Global Positioning System (GPS), Beidou, COMPASS, Galileo, GLONASS, Indian Regional Navigational Satellite System (IRNSS), or QZSS. The navigational system can include a receiver that receives differential correction signals in North American from the FAA's WAAS system.

Figure 5B:
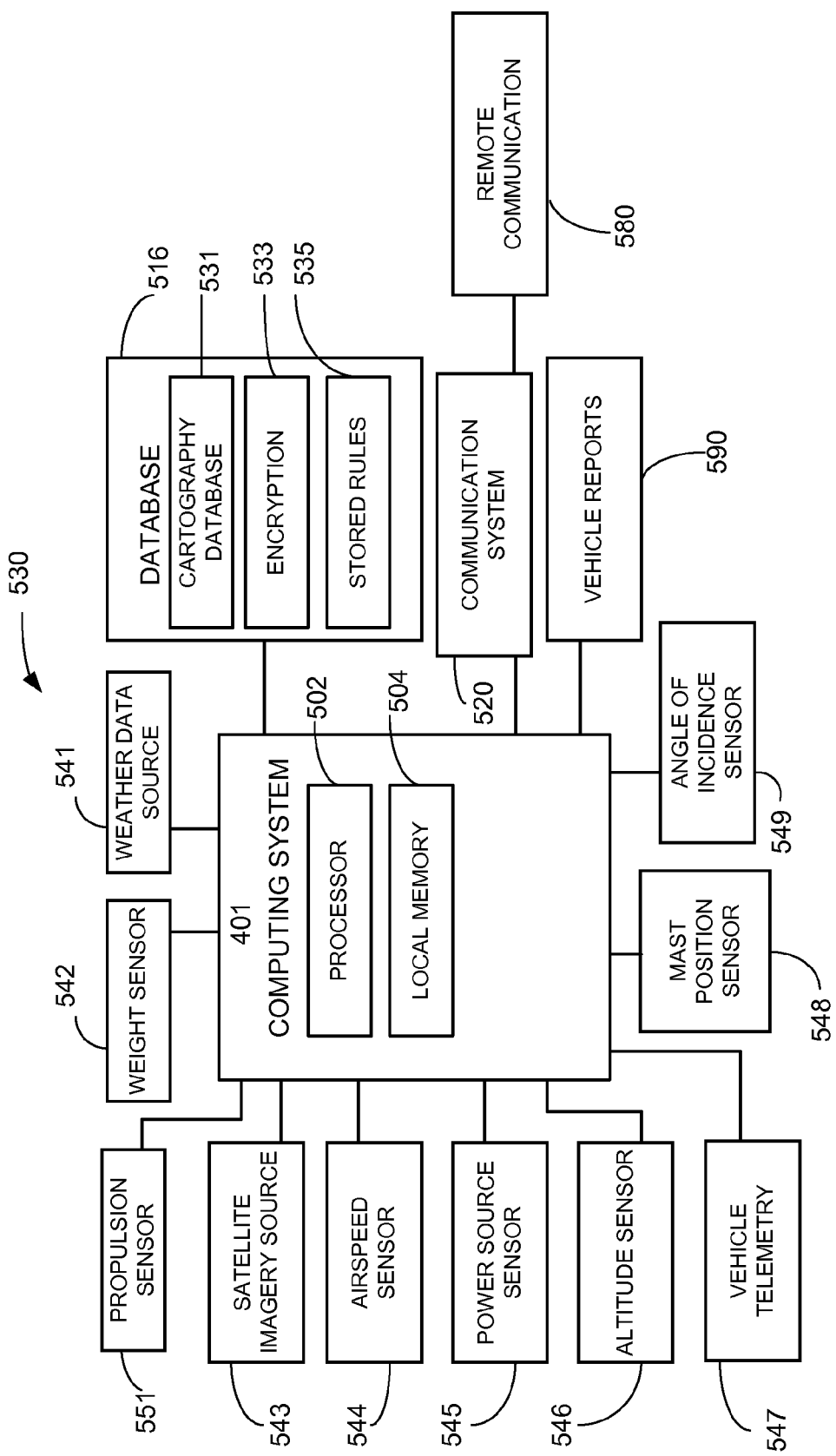
FIG. 5B is a schematic view of a controller and sensor assembly for the aerovehicle according to an example of the present invention.

FIG. 5B shows an example of a flight system 530, which includes a controller 401 in communication with a data base 516 and a communication system 590. A plurality of sensors are to sense various flight data inputs and communicate the sensed data to the controller 401 for processing using the processor or for storage in the database 516. As described herein the controller 401 includes processor 502 and local memory 504. Database 516 is protectively mounted with the controller in a black box that secures the database and processor from harm during takeoffs, landing, non-authorized intrusions, and unscheduled landings. The database 516 can include a cartography database 531 that stores the terrain information that is or could be part of the vehicles flight path. The cartography database 531 can store data relating to physical traits, including but not limited to roads, land masses, rivers, lakes, ponds, groundcover, satellite imagery or abstract data including, but not limited to, toponyms or political boundaries. Encryption rules and data 533 can also be stored in the database. Flight rules 535 are stored in the database. The processor 502 can access the cartography database 531, encryption rules or data 533, and other stored rules 535 to calculate a desired flight path and or correct for various obstacles or flight path deviations.

The controller 401, and in an embodiment the processor, can invoke various rules that can be stored in a memory and read by the controller. The loading of these flight rules sets the controller 401 to a specific machine. In an example, the controller 401 checks the "if, and, or" file for altitude restrictions, obstacles, restricted space during the planning phase. As used herein a file is code that can be stored in a machine readable form and transmitted so as to be read and loaded into the controller 401. During the "Takeoff, In Flight and Landing" phases the controller checks the flight sensor package including but not limited to: rotor rpm sensor, rotor disk angle of attack sensor, load on wheels sensors, tow bridle angle horizontal and lateral position sensor, tow bridal load % rating, horizontal stabilizer angle and trail position sensors.

Additional control rules and instructions include waypoint takeoff rules that result in the present position, e.g., as GPS grid coordinates, being entered into and stored in the controller 401. In an example, at least one waypoint is entered into the controller 401. In an example, additional waypoints are entered. Any number of waypoint coordinates can be entered. These waypoints generally define the flight path for the aerovehicle 100. Alternate flight path waypoints can also be stored in the controller 401. Separate waypoints can be stored for the landing sequence. Known obstacles along the intended flight path (as can be defined by the waypoints) can be stored in the controller for each stored flight path and landing path. The controller 401 uses stored flight route (e.g., path), weight of the aerovehicle as indicated by the landing gear load sensors or determined by an external scale, and flight data entered by the mission planning computer to recommend route changes to maintain the recommended vertical separation and ground clearance requirements. In an example, the mission planning computer can calculate these route changes and download them to the controller 401.

The controller 401 is connected to a takeoff sensor that senses when the load is removed from the landing gear sensor. The controller 401 than can change from a takeoff setting to a flight setting. The controller can delay the change to a flight setting until a certain altitude is reached. The controller 401 is also connected to a forward air speed that can indicate when never exceed velocity ($V_{NE}$) is achieved or when a stall velocity is being approached. If a stall velocity is imminent, the controller 401 can release the tow line if still attached to the tow aircraft. The controller 401 can also receive data relating to the rotor's revolution speed (e.g., RPM). In an example, the controller 401 receives this data and can calculate the current revolution speed as a percentage of maximum speed. If the maximum speed is reached, the controller 401 can instruct a brake system to slow the rotor speed. The controller can also act based on the rotor speed being too low, e.g., start the pre-rotor motor release the tow line, calculate an emergency landing, etc. An emergency landing calculation can use the navigational system coordinates, stored maps (including population centers), requests for more information, calculation of a descent path, etc. The controller 401 can also receive data relating to operation of an actuator to control a rotor disk angle of attack exceed an operational threshold, e.g., retraction or extension at a given rate (e.g., % per second).

The controller 401 can further receive data from a forward flight sensor and tracking controls. The data can include at least one of: forward speed from which a % of flight speed can be calculated; rotor disk angle of attack (e.g., from a mast sensor); tow angle of a bridle (to which the tow line), which can be used to determine the altitude difference relative to the towing aircraft; a lateral angle of the bridle (e.g., left and right of 180° line along the center line of the towing aircraft and aerovehicle).

The controller 401 can also receive data relating to the stabilizer system, which data can include position (extension and contraction) of stabilizer component actuators. The controller can use this data to hold the aerovehicle at a certain position (with a few degrees) behind the tow aircraft.

The controller 401 further uses sensed data for its flight rules related to a landing sequence. The landing sequence data can include but is not limited to actual forward airspeed from sensors, from which speed increase and decrease as well as position can be determined by the controller. The controller 401 can also receive data relating to whether the connection to the tow aircraft (e.g., the tow line) has been released. The controller 401 can receive data relating to rotor disk angle of attack to maintain bridal tension and vertical position. When in free flight the controller 401 can monitor the flight speed and once the bridal, e.g., the tow line, is release, then the ground radar on the aerovehicle is activated. Using the ground radar or the forward velocity then controller 401 can control the position of the rotor disk (e.g., blade) angle actuator to control the position of the blades. Near the ground, e.g. within 100 feet or within 20 feet of the ground, the controller further increases the rotor disk (e.g., blade) angle. The increase in the rotor disk angle need not be linear and can increase faster as the ground approaches based on both the speed (decent and forward) and the distance to the ground. In an example, the controller further has the pre-rotor motor add power to the rotating blades immediately before the landing gear touches the ground. The controller can further use data from the load sensors to sense when touchdown occurs as the load will increase on these sensors at touchdown. When touchdown occurs, the controller 401 will cut power to the pre-rotor motor. The controller 401 can engage rotor brakes and or landing gear brakes.

A communication system 520 is in communication with the controller 401 and is adapted to communicate with other devices outside the aerovehicle 100 for remote communication 580. The remote communication 580 can be with other vehicles 100, the tow aircraft, or with ground based communication devices. Accordingly, real time external data and commands can be received by the controller 401 and flight performance can be altered by the controller interpreting this data and/or commands to generate control signals to controllable components in the aerovehicle.

The sensors 541-549, 551 can be adapted to sense various data that relate to performance of the aerovehicle 100 and electrically communicate the sensed data to the controller. The sensors 541-549, 551 can send raw sensor data to the controller 401 for interpretation. In an example, the sensors 541-549, 551 include processing circuits that interpret the raw data into data that can be used by the controller without further processing. A weather data source 541 senses various weather conditions, including visibility, rain, sun light, cloud cover, cloud height, barometric pressure, among others. In an example, the weather data source 541 is a sensor that senses the weather and can be mounted to the body of the vehicle such that the sensor can sense weather outside the vehicle body. A weight sensor 542 is adapted to sense the weight of the vehicle and can be mounted to at least one part of the frame. In an example, a weight sensor 542 is mounted to each of the legs of the vehicle frame to provide data from which the controller 401 can determine or derive the vehicle's center of gravity. A satellite imagery source 543 is adapted to sense satellite imagery data sent to the vehicle from remote device, such as directly from a satellite. Thus current satellite imagery is available to the controller to make in flight corrections in essentially real time after takeoff. An airspeed sensor 544 senses the airspeed of the vehicle. A power source sensor 545 senses at least one of the consumption of power from the power source or the actual power stored in the power source. The controller can use the power source data to reduce power consumption if needed to complete the flight plan. An altitude sensor 546 senses the height of the vehicle above the ground. A vehicle telemetry sensor 547 senses the real-time position of the vehicle 100 and can use signals from global navigation systems. A mast position sensor 548 determines the position of the mast 130 of the autogyro assembly 100. The controller 401 can use the mast position sensor 548 to correctly position the mast 130 within in its range of movement in a horizontal plane of movement to position the mast in as close to the center gravity of the loaded vehicle as possible to improve the flight characteristics of the vehicle. A propulsion sensor 551 can sense operation of a motor and propeller in the embodiment where the vehicle has a propulsion system.

In operation the controller 401 can use stored data in the database 516 with sensed data from sensors 541-549, 551 to control flight of the vehicle when loaded with cargo or while being towed. The controller 401 can also operate as an autonomous vehicle return system using the stored data in the database 516 with sensed data from sensors 541-549, 551 to control flight and return an empty vehicle back to its designated home position. In an example, a tow aircraft such as a plane, a vehicle with a propulsion system, a balloon, or other lift devices can provide forward movement such that an empty vehicle 100 can fly on its own or sufficient altitude that a dropping of the empty vehicle will result in sufficient forward movement so that the rotating blades provide lift to maintain the vehicle 100 in flight.

Figure 6:
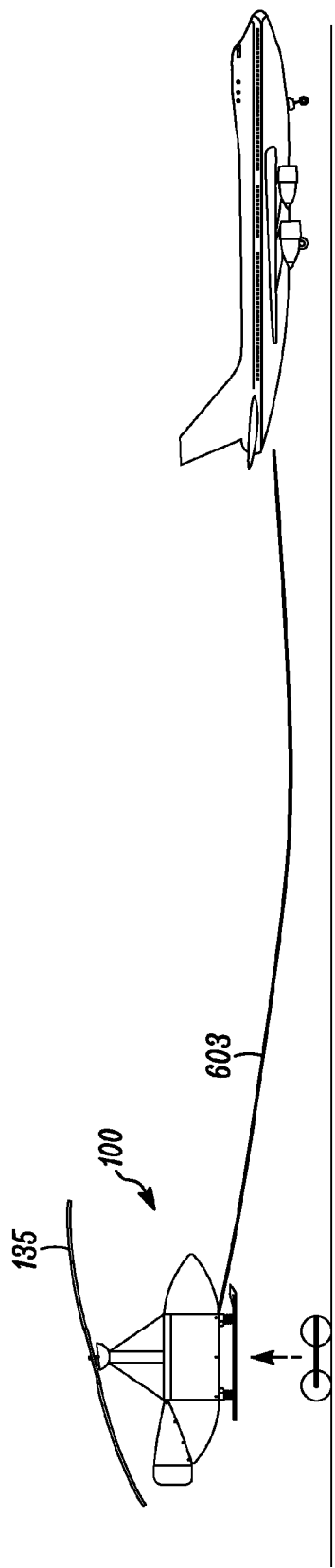
FIG. 6 is a schematic view of an aerovehicle during takeoff according an example of the present invention.

FIG. 6 shows a schematic view of the unmanned aerovehicle 100 immediately after takeoff. The aerovehicle 100, which does not have sufficient engine power to fly on its own, is connected to an tow aircraft 601, here shown as an airplane, by a tow line 603. The controller sends instruction so that the motor on board the vehicle begins rotation of the rotary wing. The rotary wing is rotated to at least 30% of its desired rotational speed before the towing aircraft begins its forward movement. In an example, the rotary wing is rotated up to 50% of its desired flight rotational speed. In some examples, the rotary wing is rotated up to 75%, or less than 100% of its desired flight rotational speed. Once the rotary wing is at a take-off speed, then the towing aircraft 601 can provide the initial propulsion to drive the vehicle forward such that air flows over the rotary wing, e.g., the blades 135. The vehicle 100 can contain cargo that results in the vehicle 100 having a gross vehicle weight that is up to about the same as the towing aircraft 601. During takeoff, the cargo body 105 rolls forward on the undercarriage 103, which includes a removable trolley that has wheels to allow the vehicle 100 to move forward at direction of the towing aircraft with an acceptable low resistance such that the towing aircraft and the aerovehicle can achieve flight. In this example, the rotary wing of the vehicle provides enough lift to achieve flight shortly prior to the ascent of the towing aircraft 601. In the illustrated example, the vehicle 100 leaves the trolley on the ground. The vehicle undercarriage can include further landing devices such as wheels, skis, etc. In an example, the vehicle 100 takes off before the towing aircraft 601 to establish a flight formation with the vehicle 100 at a slightly higher altitude than the towing aircraft 601 at the time of takeoff.

In an example, the tow line 603 includes, in addition to being a mechanical connection between the towing aircraft 601 and the aerovehicle 100, electrical communication lines between the towing aircraft 601 and the aerovehicle 100. In some embodiments, the tow line 603 can include any number of ropes (synthetic or natural fibers), cables (metal or polymer), wires, and/or other connective structures that are or become known or practicable. In an example, the tow line 603 includes a power cable component that is electrically insulated from a signal line and the mechanical component. The tow line 603 can connect an electrical power source on the aircraft 601, e.g., an electrical generator or alternator which are driven by the aircraft motor, to the vehicle 100. Both the aircraft 601 and vehicle 100 can include outlets at which the electrical communication line of the tow line 603 is connected. The tow line 603 can further provide bidirectional communication between the towing aircraft 601 and the controller of the vehicle. The pilot of the tow aircraft 601 can send data and/or commands to the controller of the vehicle 100. The aircraft 601 can further automatically send data to the controller of vehicle. As a result the sensors on the aircraft can provide additional data that can be used by the controller, e.g., 401, to control flight of the vehicle 100. In an example, the controller controls the angle of incidence of the rotating blades based at least in part on data communicated from the towing aircraft 601. The controller can further take into account data that is received from on-vehicle sensors as well.

Figure 7:
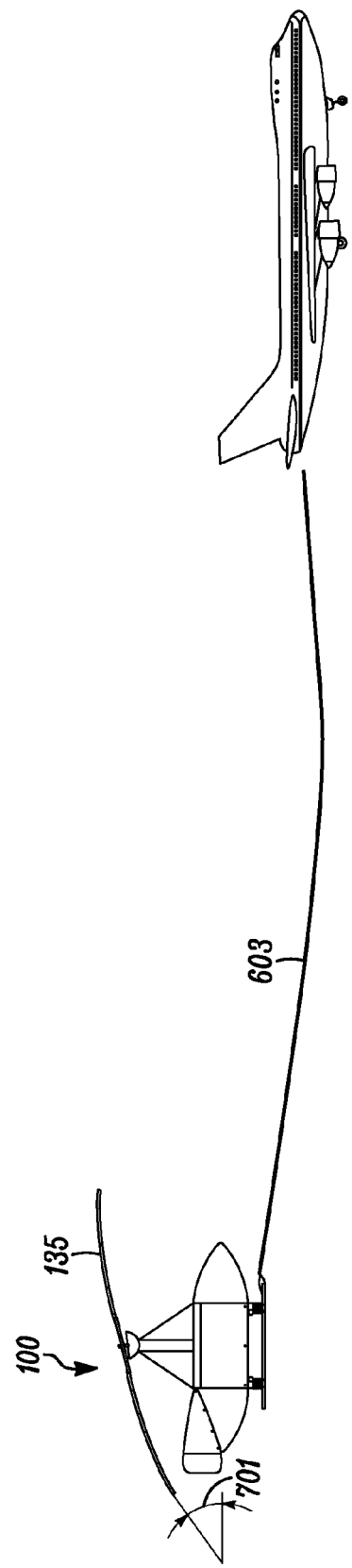
FIG. 7 is a schematic view of an aerovehicle during flight according an example of the present invention.

FIG. 7 shows a schematic view of the unmanned aerovehicle 100 in flight and being towed by the aircraft 601. The aircraft 601 continues to provide the thrust to move the vehicle 100 through the air such that the air passes over the rotary wing (e.g., airfoil blades 135), which provides the lift to the vehicle 100. In flight, the vehicle 100 typically flies at a slightly higher altitude than the aircraft 601. In an example, the vehicle 100 flies at an altitude whereat the turbulence from the towing aircraft does not affect the flight of the vehicle 100. The altitude of the towing aircraft 601 can be sent to the vehicle 100 over the tow line 603. In an example, the altitude of the towing aircraft can be sent over a wireless connection (e.g., communication components 520, 580) to the vehicle 100. The control system of the vehicle 100 can then set the altitude of the vehicle based on the data received from the towing aircraft 601. In an example, the control system (e.g., controller 401) of the vehicle can receive altitude data from sensors onboard the vehicle and set the flight altitude based on this data. The controller can set the angle of the rotor 701, which changes the angle of incidence of the airfoil blades by activating actuators to move the hub and or blades themselves.

The towing aircraft 601 tows the aerovehicle 100 to the landing zone. The tow aircraft 601 tows the aerovehicle 100 over the landing zone. The sensors onboard the aerovehicle 100 sense various characteristics at the landing zone. The control system including controller 401 use this data to calculate a flight path for landing the vehicle at the landing zone. In an example, the towing aircraft 601 can also sense characteristics and send the sensed data to the vehicle. In an example, the towing vehicle releases the vehicle 100 prior to the landing zone and the vehicle calculates a flight path based on stored data, such as flight rules and a stored target landing zone, as it approaches the target landing zone. The flight path may be stored in the memory of the control system and the controller can change the flight path based on current, sensed data. The vehicle 100 itself may circle the landing zone to have time to sense ground and flight data. In an example, the vehicle 100 includes a ground sensor, such as an imager, a camera, a radio frequency sensor, to determine the condition of the landing zone.

Figure 8:
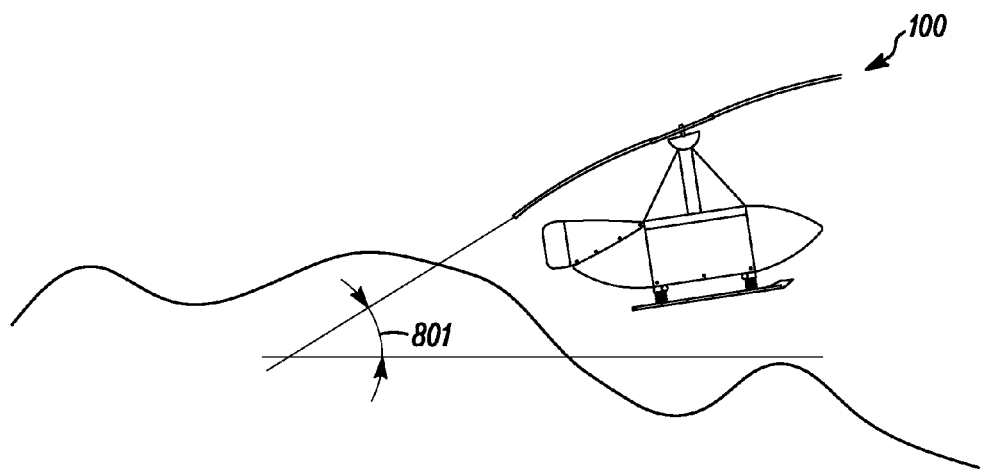
FIG. 8 is a schematic view of an aerovehicle during release according an example of the present invention.

FIG. 8 shows a schematic view of the unmanned aerovehicle 100 after it is released from the tow aircraft 601. Vehicle 100 continues to fly but will gradually loose air speed and, hence, lift. The stabilization of flight angles (roll, yaw and pitch) and the rates of change of these can involve horizontal stabilizers, pitch of the blades, and other movable aerodynamic devices which control angular stability, i.e., flight attitude, horizontal stabilizers and ailerons can be mounted on the vehicle body. Each of these devices can be controlled by the controller. During this free flight, i.e., free from a propulsion device, such as the airplane or a helicopter, the rotor angle 801 increases. The rotor angle 801 is measured along the plane of rotation of the blades relative to the plane of the ground. Accordingly, the angle of incidence of the airfoil blades likewise increases.

Figure 9:
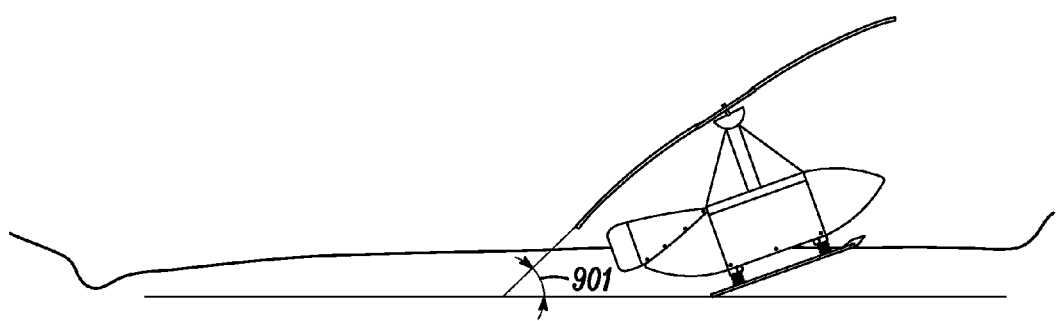
FIG. 9 is a schematic view of an aerovehicle during landing according an example of the present invention.

FIG. 9 shows a schematic view of the unmanned aerovehicle 100 at landing. The aerovehicle 100 flares at the landing so that is can land with a near zero forward momentum at the ground. This flaring action is controlled by the controller and results in the rotor angle 901 being further increased relative to rotor angles at the takeoff profile angle 611 (FIG. 6), the flight profile angle 701 (FIG. 7), and free flight profile angle 801 (FIG. 8). As shown the rotor angle 901 can be about 45 degrees, +/−5 degrees. In an example, the rotor angle 901 is less than about 60 degrees, +/−5 degrees. The controller can control the degree of flare at landing depending on the landing conditions. For an example, if the vehicle will land on a runway that is suitable for the landing gear on the undercarriage, e.g., wheels on a paved or unpaved prepared runway or skis on a snow or ice runway, the flare angle may be less than 45 degrees and the vehicle will roll to a gentle stop while still having forward velocity at touchdown for stability. If landing in rough, unprepared terrain, the flare may be severe to reduce the ground roll as much as possible to protect the vehicle and landing environment from damage. In an example, the aerovehicle 100 can land in a landing zone of less than 500 feet in length. In an example, the landing zone is less than 300 feet in length. In an example, the landing zone is a minimum of 50 feet. In an example, the landing zone is a minimum of 100 feet. The controller can land the vehicle in a landing zone that is twice the width of the vehicle.

Some applications may require the use of multiple vehicles to be flown together. Multiple vehicles can simultaneously deliver equipment and supplies to remote locations for example for scientific expeditions, military uses, Antarctic expeditions, geological and oceanic expeditions. Vehicles 100 can be configured so that more than one vehicle can be towed by a single tug aircraft or multiple vehicles 100 can be flow by multiple tug aircraft. When in a formation the controllers 401 of multiple vehicles can communicate with each other to establish and maintain a formation. In an example, the plurality of vehicles can communicate with each other via their respective communication systems 520 (FIG. 5B). The vehicles can maintain a safe distance from each other and, if present, other aircraft. The controllers 401 can make adjustments to the flight control components, e.g., pitch control, vertical stabilizers, horizontal stabilizers, etc., to maintain the formation. When released from the tug aircraft the controllers will control the flight of the plurality of vehicles to safely land all of the vehicles at the designated target.

Certain components for the vehicle 100 or 1000 can be removed from the vehicle after delivery of the cargo at a landing site. The controller 401 is designed as a sealed, black box that can be released from the interior of the vehicle body.

The airfoil blades 135 can be released from the hub or the blade supports. The hub 132 can also be removed from the mast in an example. Any of the sensors 541-549, 551 can be removed from the vehicle. Any of the removed components can be packed in an intact vehicle 100 and flown out of the landing site. Thus, the more expensive components can be retrieved for later use on other vehicle bodies. This further reduces the cost of cargo delivery in the event that it is impractical to return to the landing zone to individually retrieve all of the aerovehicles. In an example, up to five vehicles are broken down with certain components removed and placed in a sixth aerovehicle. This sixth aerovehicle is retrieved using a towing aircraft or is a self-propelled model that flies itself from the landing zone. The controller of the sixth aerovehicle will control the vehicle during its return flight.

Figure 10A:
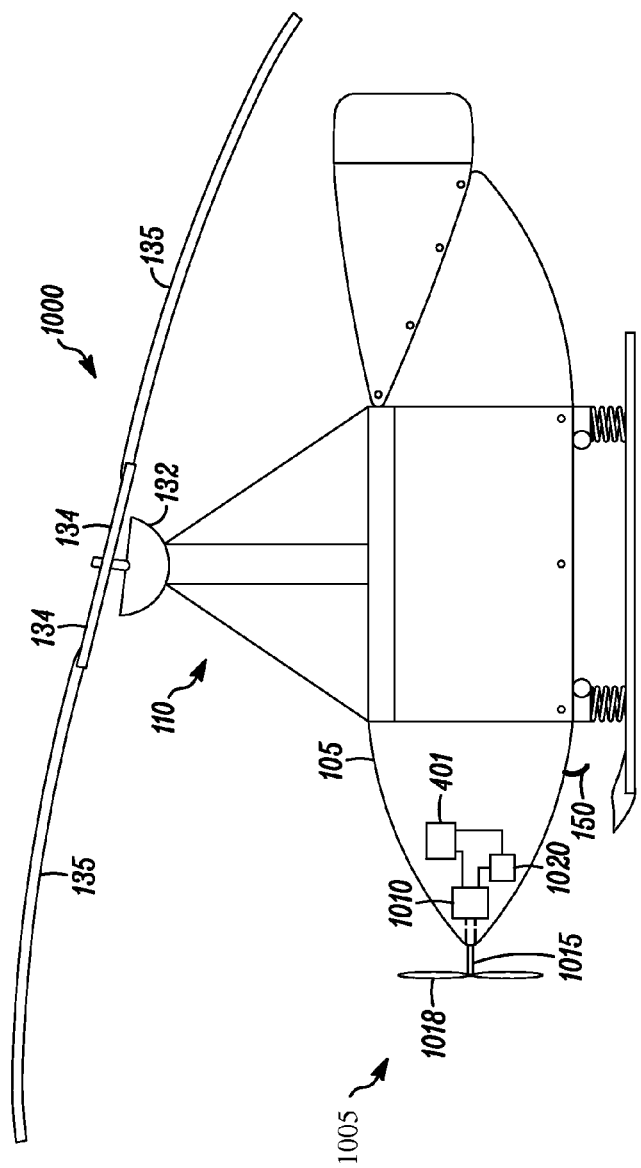
FIG. 10A is a side view of an aerovehicle with a propulsion system according an example of the present invention.
Figure 10B:
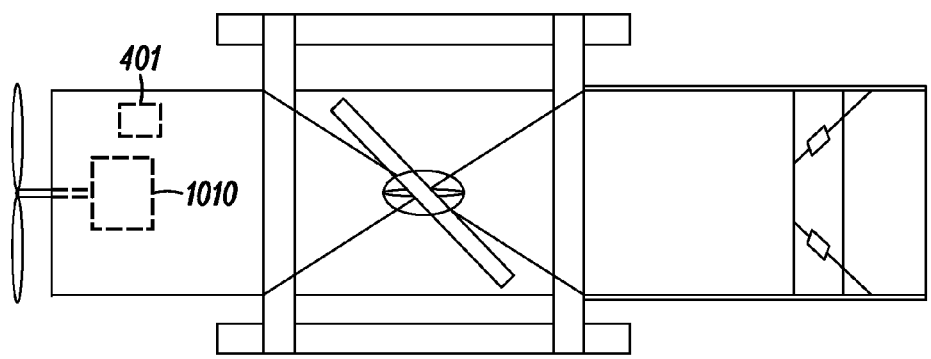
FIG. 10B is a top view of an aerovehicle with a propulsion system according an example of the present invention.
Figure 10C:
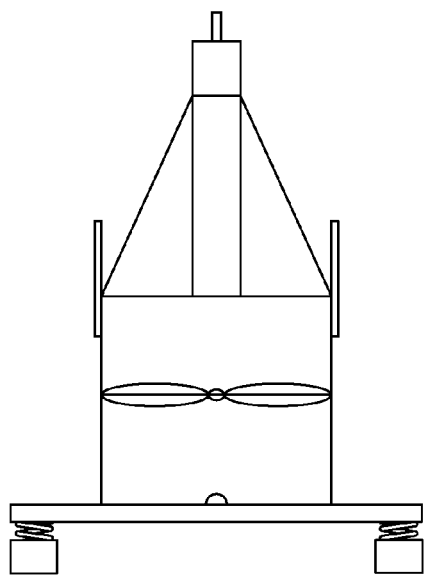
FIG. 10C is a front view of an aerovehicle with a propulsion system according an example of the present invention.

FIGS. 10A-10C shows an embodiment of the aerovehicle 1000 with a propulsion system 1005. The aerovehicle 1000 can include the same components as the aerovehicle 100 as described herein, including the controller 401, autogyro assembly 110, etc. The propulsion system 1005 includes a motor 1010 that drives a drive shaft 1015 that extends outwardly of the body of the vehicle 100 to connect to a propeller 1018. A power source 1020 is also connected to the propulsion motor 1010 and the controller 401. The motor 1010 can be a low power, e.g., less than 100 horse power motor. In one specific example, the propulsion system 1005 is designed to be able to provide enough forward movement to the vehicle 1000 so that the autogyro assembly 110 can provide the lift to the vehicle 1000 to achieve and maintain flight. The motor 1010 and propeller 1018 are selected to provide enough forward movement so that there is sufficient air flow over the rotating blades 135 to provide lift to an empty or essentially empty vehicle. Accordingly, the propulsion system 1005 can recover the vehicle but cannot deliver any heavy cargo. The motor 1010 can be a 50 h.p. motor that runs on fuel stored in the power source 1020. The fuel can be diesel fuel in an example.

In a further application, the propulsion system 1005 is designed to be able to achieve flight with the vehicle 1000 storing the airfoil blades 135 and controllers 401 of at least two other vehicles 100. This allows the some components of a fleet of vehicles 100 or 1000 to be retrieved using a vehicle 1000.

It will further be recognized that the propulsion system 1005 can be used to assist the towing aircraft in pulling the vehicle 1000. Accordingly, the vehicle 1000 can haul more cargo with less input power from the towing aircraft.

If an engine fails in the propulsed aerovehicle 1000, then the forward momentum of the aerovehicle 1000 will continue to rotate the rotary blades and gradually allow the aerovehicle to descend to the ground as the lift decreases as the relative movement of the air against the rotary blades decreases. The aerovehicle would slowly descend until landing.

Figure 11:
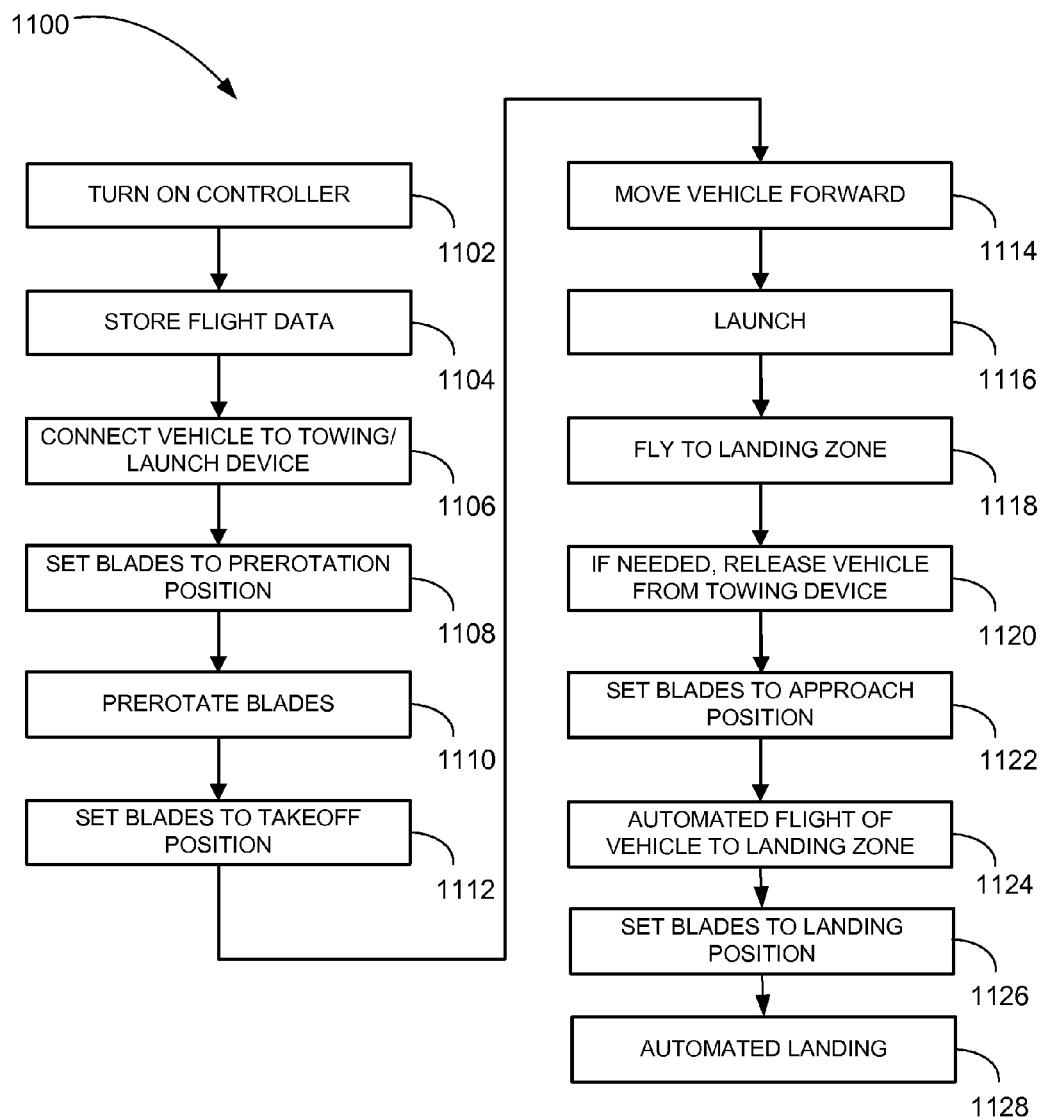
FIG. 11 is a flow chart of an aerovehicle method according an example of the present invention.

FIG. 11 shows a method 1100 of flight for an aerovehicle 100, 1000 as described herein. At 1102, the controller is powered on. The controller can then perform various safety checks and check of the operational condition of the sensors on board the vehicle. The controller can further power the sensors. The controller can check the power status of the power source to determine if sufficient power is in the power source or will be available to complete a flight. The controller can also perform checks of the electronic equipment such as the memory and the communication components.

At 1104, the controller requests and stores the flight data for the current flight. The flight data can include data relating to a flight plan including, but not limited to, distance, flight altitudes, estimated time of arrival, landing zone, predicted weather, etc.

At 1106, the aerovehicle is connected to a towing aircraft or to a launching device. The connection is at least a mechanical connection to transfer power from the towing/launching device to the vehicle. In an example, electrical connections are also made.

At 1108, the airfoil blades are set to a prerotation position. The prerotation position is a minimal angle of incidence to reduce drag on the blades when being rotated. The purpose of prerotation is to assist in the takeoff by overcoming the initial inertial forces in the autogyro assembly in general and specifically on the airfoil blades. Accordingly, the prerotation position of the blades provides minimal, if any, lift.

At 1110, the airfoil blades are rotated. This is the pretakeoff stage. Once the blades are spun up to a desired speed, e.g., revolution per minute, the pretakeoff stage ends.

At 1112, the airfoil blades are set to a takeoff position. The blades now have an angle of incidence that can provide lift to the vehicle. The controller can send a signal to actuators to control the position of the airfoil blades. The takeoff position has an angle of incidence greater than the prerotation position.

At 1114, the vehicle is moved forward by the towing vehicle or the launch device. The forward movement of the vehicle creates airflow over the airfoil blades that are set to a takeoff position. This airflow over the rotating airfoil blades creates lift that can achieve flight of the vehicle even when loaded with cargo that could not be flown by the towing vehicle alone. The controller can set the angle of incidence of the airfoil blades to a flight position after the aerovehicle is airborne. The flight position of the airfoil blades has a lesser angle of incidence than the takeoff position.

At 1116, the vehicle is launched and achieves flight as there is sufficient airflow over the rotating airfoil blades to achieve flight. The controller can control the flight of the vehicle in response to stored data and rules, sensed data, and received inputs from the towing aircraft, fellow vehicles, or from ground communications. The controller can set the angle of incidence of the airfoil blades. The flight position of the airfoil blades has a lesser angle of incidence than the takeoff position.

At 1118, the vehicle is flown from the takeoff location to the landing zone. The vehicle can be towed to the landing zone by an aircraft. In another example, the vehicle is launched and flies itself to landing zone. In an example, the vehicle is towed to a location where it can complete the flight to the landing zone on its own. Due to drag and other resistive forces, e.g., friction of the rotating hub, a vehicle without a propulsion system will glide to the landing zone. A vehicle with a propulsion system can fly for a longer time and distance. If the propulsion system is adequate to provide enough forward thrust so that the drag and resistive forces are overcome, the vehicle can fly for a significant distance albeit at a slow speed.

At 1120, if needed, the vehicle is released from the towing aircraft. The release of the tow line can be in the form of a glider release mechanism controlled by either the towing aircraft, pilot of the towing aircraft, or by the controller of the aerovehicle. Once released, the controller controls flight components of the aerovehicle.

At 1122, the airfoil blades are set to an approach position. The controller controls the position of the airfoil blades. The approach position has a greater angle of incidence than the flight position. This will provide lift to keep the aerovehicle airborne but bleed off some of the forward momentum and velocity to slow the aerovehicle for approach. In an example, the takeoff position and the landing position have the essentially same angle of incidence, e.g., within one degree of each other.

At 1124, the vehicle automatically flies to the landing zone. The aerovehicle is in free flight on its own. As a result, the controller sense flight data and issues control signals to controllable components, such as airfoil positions, any rotational damper in the hub or mast, and any moveable component in the tail plane. The controller uses sensed data in flight rules or algorithms to output flight control signals.

At 1126, the airfoil blades are set to a landing position. The controller can issue command signals to actuators to set the angle of incidence of the airfoil blades. The landing position of the airfoil blades has a greater angle of incidence than the flight position or the approach position.

At 1128, the vehicle has landed. The controller can shut down some of the consumers of power to save energy in the power source. The controller can further send a status report via the communication system to a remote receiver, such as a ground station or the towing aircraft. The cargo in the vehicle can now be unloaded. In the event that the vehicle will be retrieved, the controller can indicate that the cargo has been removed by the load sensors indicating that the vehicle is now at its empty weight. In a further case, other vehicles can be broken down and stored in another vehicle for retrieval. The controller can signal that the vehicle loaded with components from other vehicles is ready for retrieval. The retrieval sequence of the vehicle is similar to the method 1100.

In the above method 1100, the airfoil blades have a plurality of positions. The prerotation position sets the airfoil blades at an angle of incidence of about zero degrees. The takeoff position has an angle of incidence of about 12 degrees. The flight position has an angle of incidence of about five degrees. The decent or approach position has an angle of incidence of about 12 degrees. The landing position has an angle of incidence of about 20 degrees. The present example positions can vary +/− one degree.

In the above method 1100, the controller can receive guidance signals from ground or air control systems. The air control systems can be from an aircraft that knows an approach envelope and the landing site. The air control system can send guidance data to the controller onboard the aerovehicle. The guidance data can be on a radio frequency carrier wave. The ground control system can be at a remote location and know the approach envelope and send guidance data to the controller. In an example, the ground control system can be at or near the landing zone, e.g., within a mile or within 10s of miles or within a kilometer or with 10s of kilometers. The ground system would then know of hazards at the landing site that may not be stored in the aerovehicle controller or known at a remote location. Examples of landing zone hazards are trees, utility lines, rocks, enemies, temporary hazards, etc. The ground system can alert the aerovehicle to these hazards or select a new landing zone or guide the aerovehicle around these hazards. The ground system can send a radio frequency signal, a microwave signal, or a light/optical signal that can be received by the aerovehicle controller.

Figure 12:
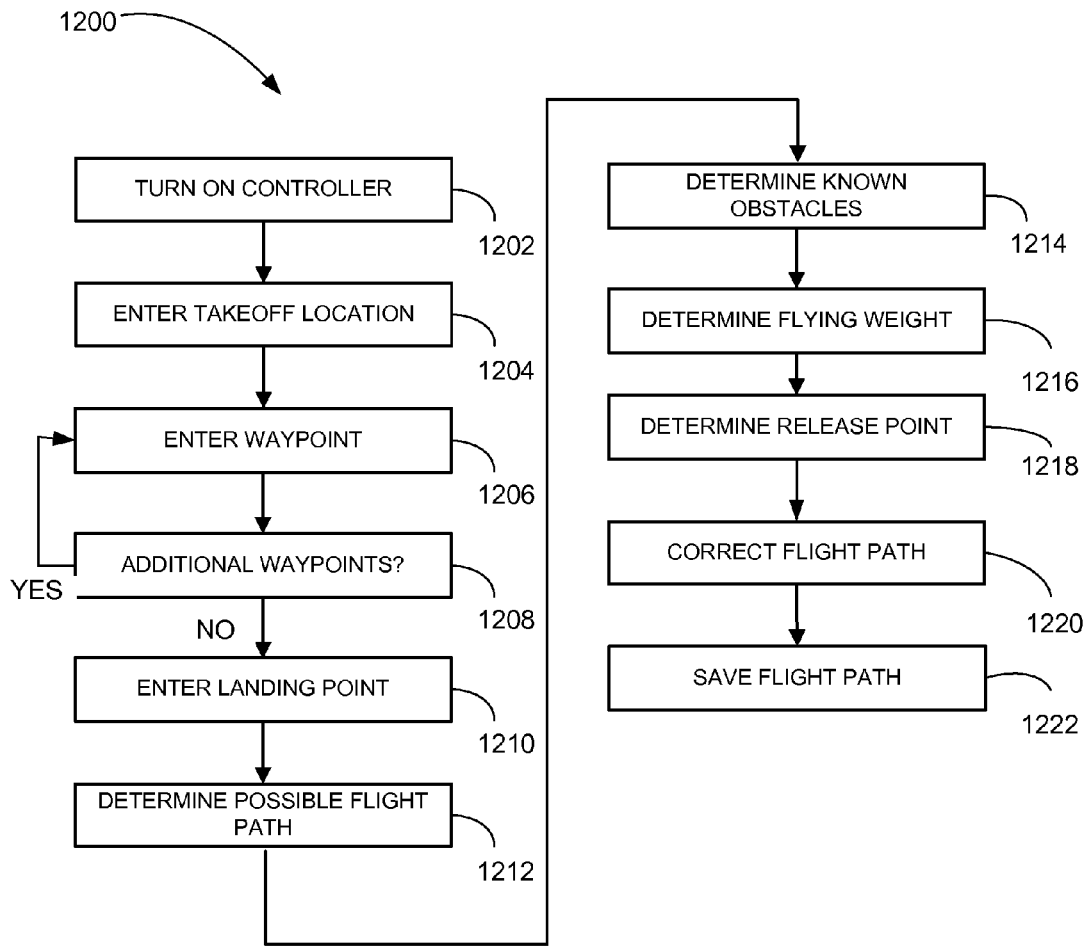
FIG. 12 is a flow chart of an aerovehicle method according an example of the present invention.

FIG. 12 shows a method 1200 of flight path calculation for an aerovehicle 100, 1000. At 1202, the controller is powered on. At 1204, the takeoff location is entered. The controller can use on board sensors to determine its current location and use that location as the takeoff location. The controller 401 can select from a database containing all nearby airfields. In an example, the takeoff location is downloaded to the controller. At 1206, a waypoint is entered into the controller. The way point is a spatial location along the intended flight path of the aerovehicle. The spatial location is a three dimension position of the aerovehicle including altitude, longitude and latitude. At 1208, a determination is made whether additional waypoints are to be entered. If yes, the flow returns to step 1206. If no, the method enters a landing point at 1210. The landing point includes the spatial location of the landing zone. At 1212, a possible flight path is computed. At 1214, a databases is accessed to determine know obstacles using the possible flight path. At 1216, the flying weight is determined. At 1218, the release point from the towing device (e.g., aircraft) is determined. This is based on the flight characteristics of the aerovehicle and the landing zone location and environment. As 1220, the final flight path is determined. At 1222, the final flight path is stored by the controller in memory accessible to the controller during flight.

Figure 13:
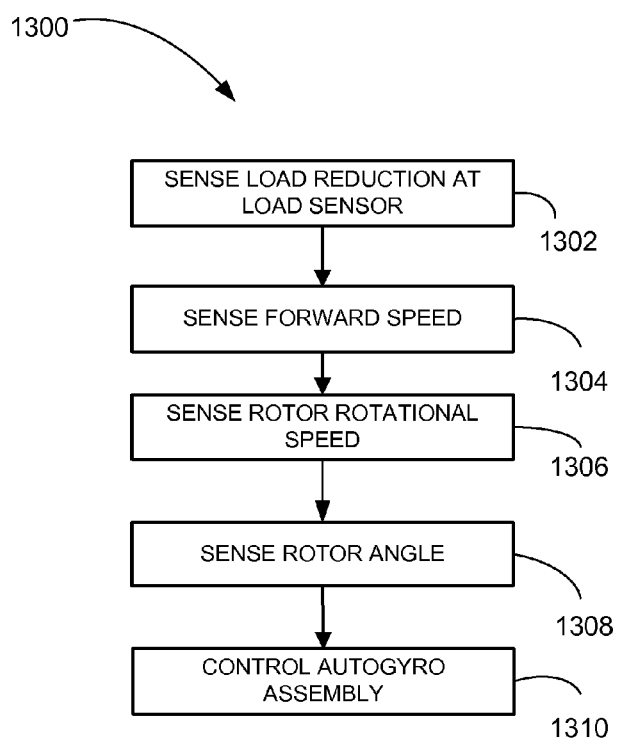
FIG. 13 is a flow chart of an aerovehicle method according an example of the present invention.

FIG. 13 shows a takeoff flight control method 1300. At 1302, the load sensor senses when the load is lessened and essentially removed from the landing gear. At 1304, the forward speed of the aerovehicle 100, 1000 is sensed. At 1306, the rotational speed of the rotor is sensed. This can be done at the hub or based on rotation of the drive shaft. At 1308, the angular position of the rotor blades is sensed. The angular position of the rotor blades is measured based on the plane that the blades rotate in versus the horizontal plane of the ground or relative to the air flow that flows against the blades. The angular position has an effect on lift and drag of the aerovehicle. Each of the sensing operations described with respect to FIG. 13 communicates the sensed data to the controller. At 1310, the controller can use the sensed data to control the operation of the autogyro assembly including but not limited to the rotor rotational speed, the rotor angle, an assist by the prerotor motor, if available, use of the propulsion system, and release of the tow line. The controller can trade altitude for forward speed to create more lift. The controller can increase the rotor angle to create more lift as long the vehicle stays above a stall speed. The controller can actuate breaks to slow the rotation of the blades to decrease lift.

Figure 14:
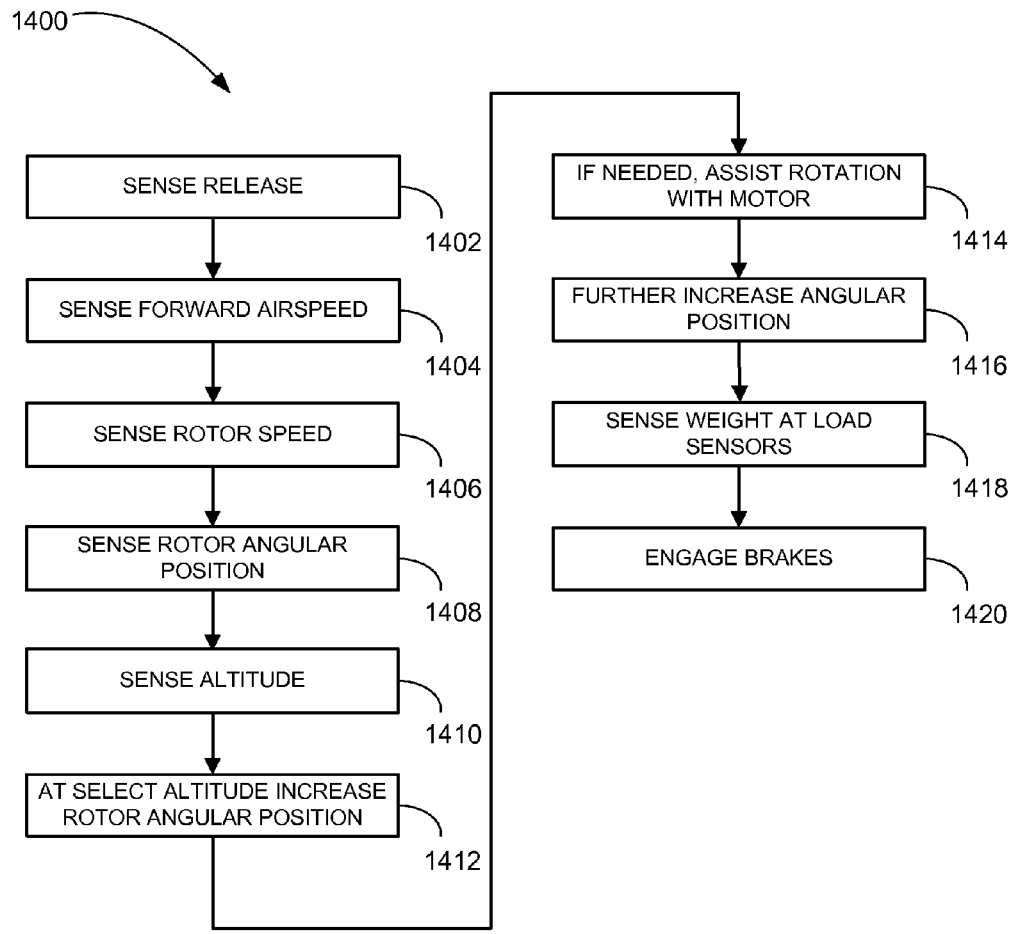
FIG. 14 is a flow chart of an aerovehicle method according an example of the present invention.

FIG. 14 shows a landing method 1400. At 1402, the release of the aerovehicle 100 or 1000 from the towing vehicle is sensed. At 1404, the forward airspeed of the aerovehicle is sensed. At 1406, the rotor rotational speed is sensed. At 1408, the rotor angular position is sensed. At 1410, the altitude is sensed. This can be sensed by a ground radar or by three dimensional navigational system signals. At 1412, the rotor angular position is increased at a first altitude. At 1414, the controller can activate the motor to assist the blades in their rotation. At 1416, the rotor angular position is further increases at a height close to the ground. At 1418, the load is sensed. At 1420, the brakes are engaged. The brakes can be rotor brakes to stop the their rotation. The brakes can also be landing gear brakes to stop rotation of the landing gear wheels or brake the landing gear skids.

In an example, the aerovehicle can be released at an altitude of greater than 10,000 feet and then automatically using the onboard controller (i.e., unmanned) control its descent to a landing zone. Accordingly, the tow aircraft can remain miles from the landing zone to ensure its safety if the landing zone is in a military area, particularly where and when an enemy may be present or consider the target to be of high value. The aerovehicle, in an embodiment, does not have a running motor during its approach or landing. Accordingly, the aerovehicle is quiet as it is free from motor (e.g., internal combustion or turbine) noise.

While the above examples show the aerovehicle 100 vehicle being towed by a plane, it will be understood that the vehicle can also be towed by other propulsion vehicles e.g., a helicopter. Another example of a propulsion vehicle is a winch that acts on a tow line to move the aerovehicle 100 forward. The tow line can be automatically released once the aerovehicle 100 has sufficient forward speed to create lift. The controller can control the release of the tow line. The winch example would be useful with the propulsion embodiment as the propulsion system can keep the aerovehicle aloft for an extended period relative to the non-propulsed aerovehicle.

FIGS. 15-18 show a dual autogyro example of an aerovehicle 1500. Aerovehicle 1500 includes a frame 1511 that defines an open interior volume in which loads and cargo can be held. Frame 1511 includes four legs 1514A-1514D with two left side legs 1514C, 1514D being joined by a longitudinal brace 1515. The longitudinal brace 1515 keeps the frame rigid and acts to spread the load. In an example, the frame 1511 does not include brace 1515. In other example, each side has at least one or a plurality of longitudinal braces. The two front legs 1514B, 1514C and the two rear legs 1514A, 1514D are respectively joined by lateral braces 1516A, 1516B, which can be shaped as arcs or inclined upwardly toward the centerline of the aerovehicle 1500. Wheels can be positioned at the lower end of the legs 1514A-1514D. At least one longitudinal brace 1519 connects the lateral braces 1516A, 1516B. A fuselage 1520 is fixed to the center brace 1519 such that the fuselage 1520 is substantially above the brace 1519. In an example, the fuselage 1520 houses the controller (e.g., controller 401 described herein) and a motor that can pre-rotate the rotary wings (blades) of a front autogyro assembly 1510A and a rear autogyro assembly 1510B. In an example, each of the surfaces of the frame can be formed to reduce drag or provide lift when the aerovehicle 1500 is moving in the forward direction.

Front autogyro assembly 1510A and rear autogyro assembly 1510B are fixed adjacent the ends of the center brace 1519. While this embodiment describes the autogyro assemblies 1510A and 1510B as front and rear, it is within the scope of the present invention to have the autogyro assemblies 1510A and 1510B be positioned in a side-by-side (e.g., left and right) configuration. When in this side-by-side configuration the aerovehicle 1500 would fly toward one of the sides relative to the description relating to FIGS. 15-18. The autogyro assemblies 1510A and 1510B would be positioned so that they can change angle of attack of the rotary wing relative to the direction in which the aerovehicle is flying or will fly. Autogyro assemblies 1510A and 1510B can each include the control features and movement features as described herein. A controller is provided to automatedly provided flight controls to the autogyro assemblies 1510A, 1510B. Each autogyro assembly 1510A and 1510B includes a plurality of airfoil blades 1535. Each airfoil blade 1535 can rotate around the shaft and be rotated to change the pitch of the blades. In an example, each of the blades 1535 of both autogyro assemblies 1510A and 1510B have a same length. In a further example, the autogyro assemblies 1510A and 1510B are positioned far apart such that the blades 1535 of the front autogyro assembly 1510A do not cross over or under the rear autogyro assembly 1510B. In another example, the blades of front autogyro assembly 1510A are interlaced with the blades of the rear autogyro assembly 1510B. In an example, the area of movement of the blades of front autogyro assembly 1510A overlap the area of movement of the blades of the rear autogyro assembly 1510B. In this case, a controller can control the rotation of the blades 1535 on the autogyro assemblies 1510A, 1510B such that the blades do not contact each other. The blades of one of the autogyro assemblies 1510B can be offset vertically such that the blades of both autogyro assemblies 1510A, 1510B overlap vertically by an amount that is more than the vertical deflection of the blades 1510B. The front and rear autogyro assemblies 1510A, 1510B can be assembled so that they are counter rotating, e.g., the front assembly 1510A rotates clockwise when viewed from above and the rear assembly 1510B rotates counter-clockwise when viewed from above.

Each of the autogyro assemblies 1510A, 1510B can be pre-rotated, or rotated, by a single motor controlled by an on-board controller. A drive shaft, which can be housed in fuselage 1520, connects the motor to shafts of both autogyro assemblies 1510A, 1510B. Gear systems can be inplace such that the autogyro assemblies 1510A, 1510B are driven at different speeds.

Horizontal stabilizers 1527 extend outwardly from a center portion of the center brace 1519 to provide stability during flight. The horizontal stabilizers 1527 extend outwardly to balance the aerovehicle 1500. The horizontal stabilizers 1527 can further be shaped like airfoils to provide lift to the aerovehicle such that the horizontal stabilizers 1527 can be thought of as wings. The addition of the horizontal stabilizers 1527 lends stability to the aerovehicle to allow an increase in flight speed relative to conventional powered, manned autogyros. The additional lift provided by the horizontal stabilizers 1527 further allow the autogyros assemblies to position the rotary wings at a lower angle of attack. Moreover, the additional lift will further allow the rotary wings to rotate at a slower speed. While shown in the center position, it will be recognized that horizontal stabilizers 1527 could be positioned as canards or tailplanes in additional to be centrally located. While shown as a fixed stabilizer, a movable elevator can be positioned in the horizontal stabilizer 1527. The position of the elevator will be controlled by an onboard controller (e.g., controller 401).

Figure 15A:
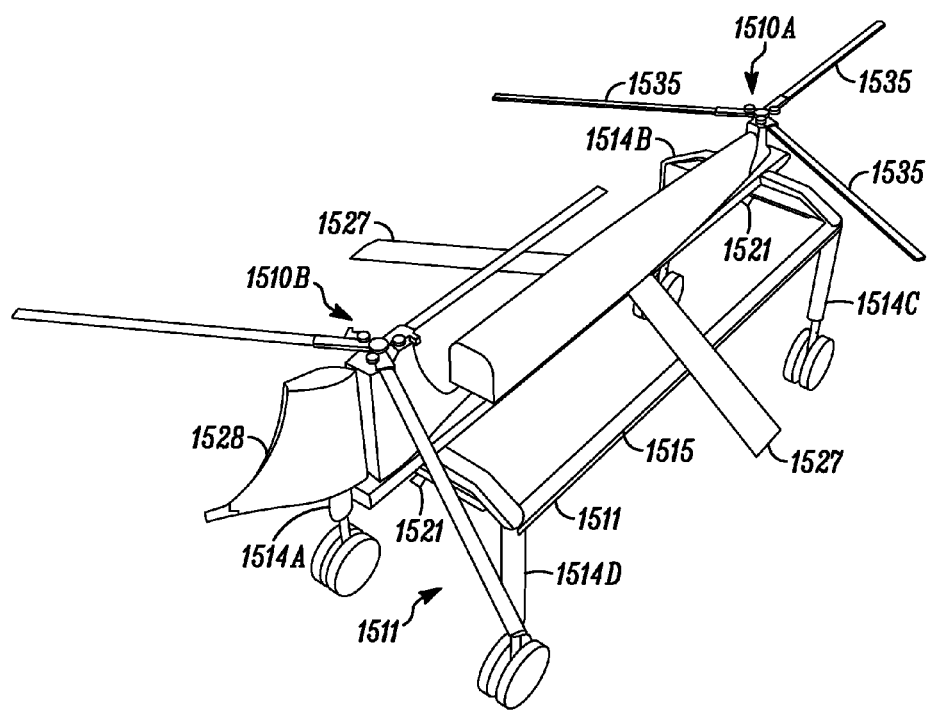
FIG. 15A is a top, rear perspective view of a dual wing aerovehicle according to an example of the present invention.
Figure 15B:
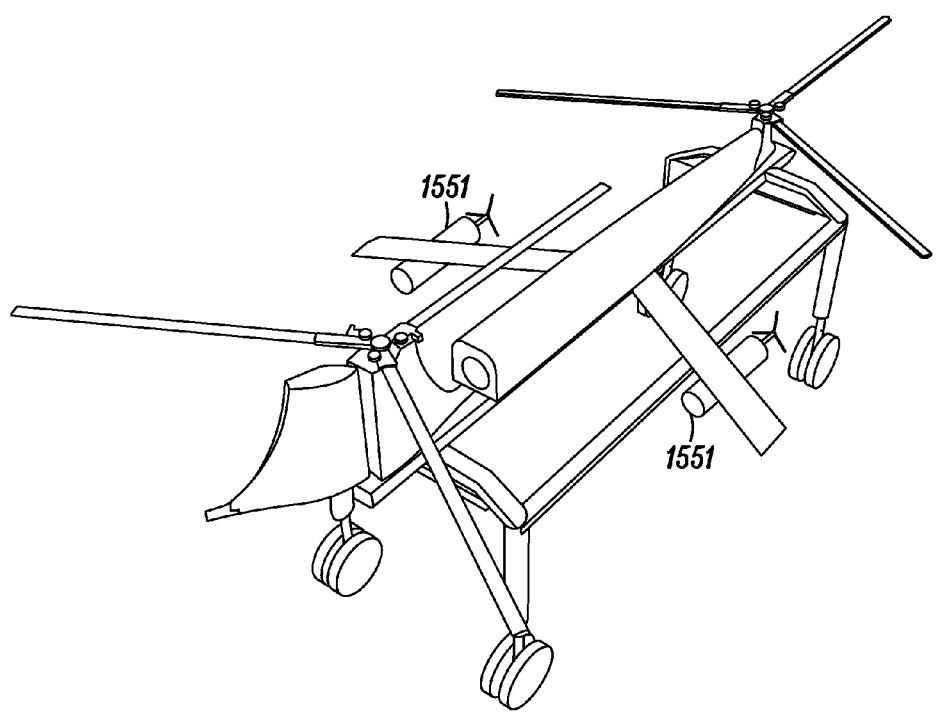
FIG. 15B is a top, rear perspective view of a dual wing aerovehicle according to an example of the present invention.
Figure 16:
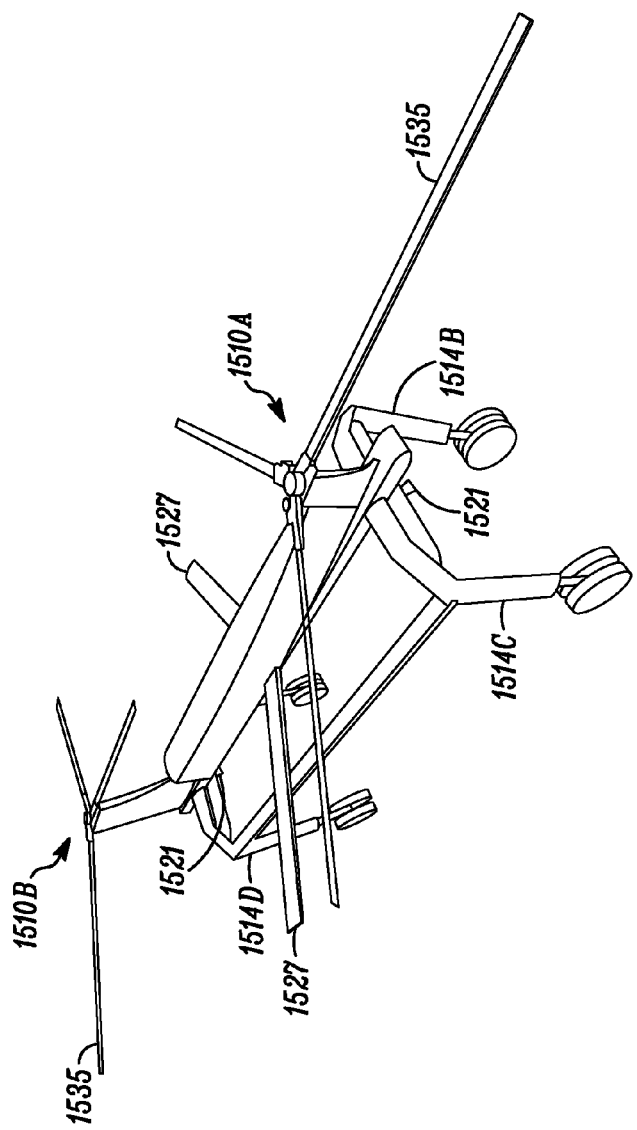
FIG. 16 is a top, front view of a dual wing aerovehicle according to an example of the present invention.
Figure 17:
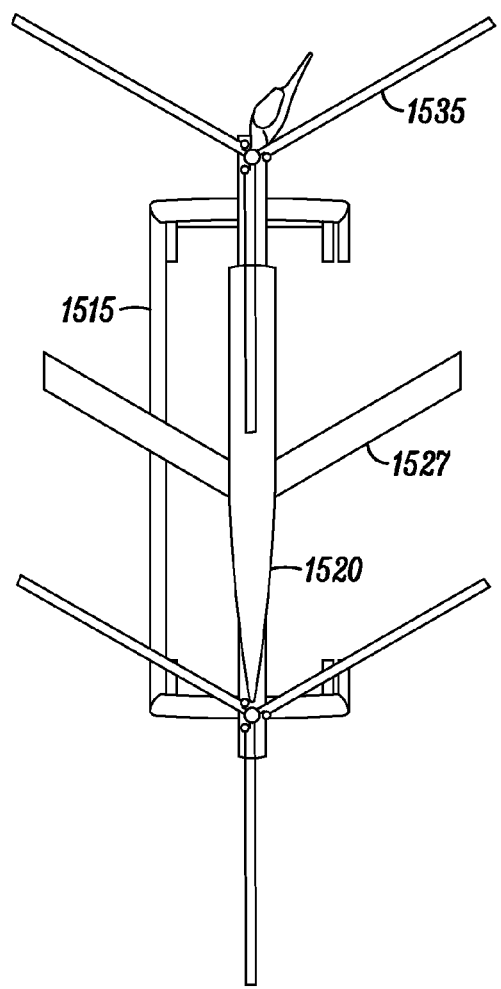
FIG. 17 is a top view of a dual wing aerovehicle according to an example of the present invention.
Figure 18:
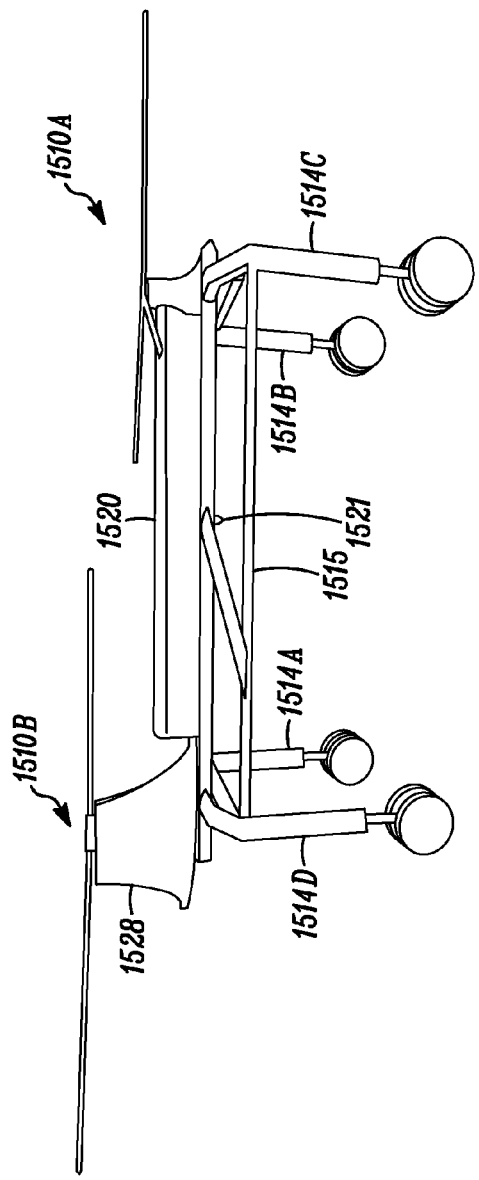
FIG. 18 is a side view of a dual wing aerovehicle according to an example of the present invention.

In another example shown in FIG. 15B, propulsion systems 1551 include a nacelle that a house propulsion system therein, which can be fixed on the horizontal stabilizers 1527. Each nacelle can house a motor, such as an electrical motor, which can be controlled by a controller and a propeller connected to the motor to provide propulsion to the aerovehicle 1500. The aerovehicle 1500 can further include a propulsion system 1005 as described above. Propulsion system 1005 can be positioned at the front of the aerovehicle 1500. In use, these propulsion systems 1551 (and/or system 1005) can provide sufficient forward movement so that the aerovehicle 1500 can fly on its own at least when released from a sufficient altitude. In a further example, the aerovehicle 1500 can fly and takeoff on its own when it is free of a cargo. In an example, the weight of the aerovehicle 1500 is about ten thousand pounds and the propulsion systems are designed to move the aerovehicle forward such that the stabilizers 1527 acting as wings and the rotary wings 1535 of the autogyro assemblies generate sufficient lift for the aerovehicle 1500 for the aerovehicle to take off. The controller on-board the aerovehicle 1500 can control a plurality of propulsion systems and a plurality of autogyro assemblies for takeoff, flight, and landing of the aerovehicle.

A vertical stabilizer 1528 is positioned at the rear of the center brace 1519. Vertical stabilizer 1528 is positioned aft of the rear autogyro assembly 1510B. Vertical stabilizer 1528 can rotate about a vertical axis to help control the flight path of the aerovehicle 1500. The position of the vertical stabilizer 1528 is controlled by a controller (e.g., controller 401). The position of the vertical stabilizer 1528 can help the aerovehicle 1500 to track the flight path of the tug aircraft.

Both the horizontal and vertical stabilizers 1527, 1528 can be fabricated from lightweight materials, such as aluminum or carbon fiber or plastics or composites thereof, to keep a low weight to lift ratio.

The stabilizers 1527, 1528 can increase the speed at which the aerovehicle can fly. Accordingly, the aerovehicle 1500 can not only increase the amount of cargo carried by a combination of tug aircraft and aerovehicle but can deliver the cargo at a faster rate than a combination of tug aircraft with aerovehicle without stabilizers 1527, 1528.

Aerovehicle 1500 is adapted to carry loads and cargo that can be carried by other examples described herein and to carry loads or cargo that are too large or oddly shaped so that the cargo would not fit with the body of these other examples. Here the frame 1511 is an open frame that defines a large volume within its interior to hold cargo and allow cargo to extend outwardly beyond the frame 1511. The legs 1514A-1514D of the frame can be quite high, e.g., greater than 5 feet or greater than 8 feet or greater than 10 feet. In an example, the legs 1514A-1514D are extendable in a range from 5 feet to 12 feet or more. The cargo must be secured to the frame 1511 so attachments 1521 are provided on the frame 1521. The attachments 1521 can be hooks, cleats, or anchors whereat cargo can be tied. In an example, attachments can be winches that include a coil of cable and an electric motor that can be operated by the controller in the aerovehicle 1500. In an example, the electric wench can be centrally positioned with cables extending outwardly to pulleys at the front or rear or sides of the frame. The controller can operate the electric motor to control the load. With the multiple autogyro assembly example, the center of gravity moves out to the ends of the frame outside the autogyro assemblies, 1510A, 1510B as opposed to being directly under the autogyro assembly when in the single autogyro assembly embodiment. This allows for a more stable flight profile of the aerovehicle 1500 and reduces the need to balance the cargo before takeoff. In an example, the aerovehicle 1500 should be able to carry an 80 ton load if the tug aicaft can move the aerovehicle 1500 with the assistance of any on-board propulsion system.

Aerovehicle 1500 (and aerovehicles 100, 1000) has multiple uses as it is a cargo carrying frame example. It will be recognized that cargo holding units can be carried by the aerovehicle 1500. This allows a single aerovehicle 1500 be adapted to multiple uses. In an example, a fuel tank can be secured to the frame and the aerovehicle is a fuel tanker to refuel aircraft or to delivery fuel to remote locations. The fuel tank can be dropped at the site and the aerovehicle 1500 can fly back to a base for further use. Aerovehicle 1500 can be adapted for various emergency deliveries, such as food drops to people stranded or remote animal feed by attaching an aerial drop container, which can be dropped as a whole unit or can have a door that can open and drop the cargo at a location. If the container is dropped as a whole unit, the container can include a parachute to insure that the container drops safely to the ground. Such a drop can be controlled by an onboard controller to open a door to drop cargo from the container. The container can further be a water bombing or firefighting container. Other types of goods that could be delivered include emergency supplies, such as water, housing, life rafts, etc.

In an example, the aerovehicle 1500 (and aerovehicles 100, 1000) can operate similar to a military aircraft that uses a pallet drop system. However, a conventional pallet drop system has the limitations on size, typically 4 feet by 4 feet by 4 feet. A drop from the aerovehicle 1500 is not limited to this size as the aerovehicle 1500 can carry larger containers and pallets.

Figure 19:
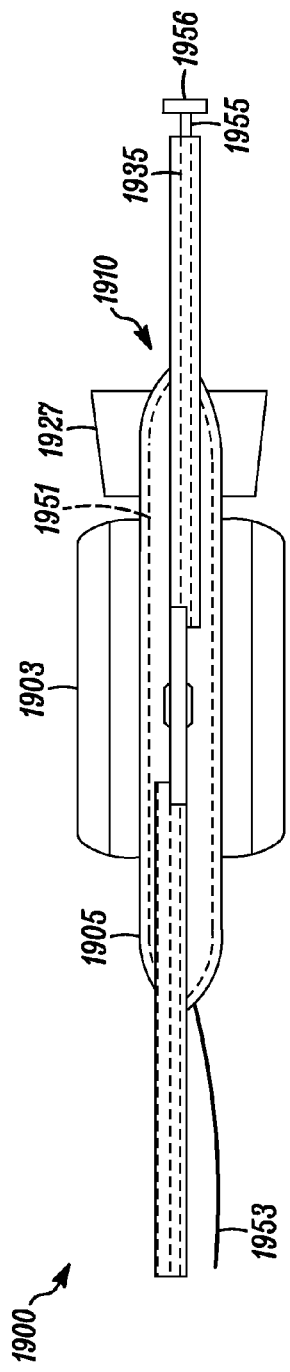
FIG. 19 is a top view of an aerovehicle with a liquid tank according an example of the present invention.
Figure 20:
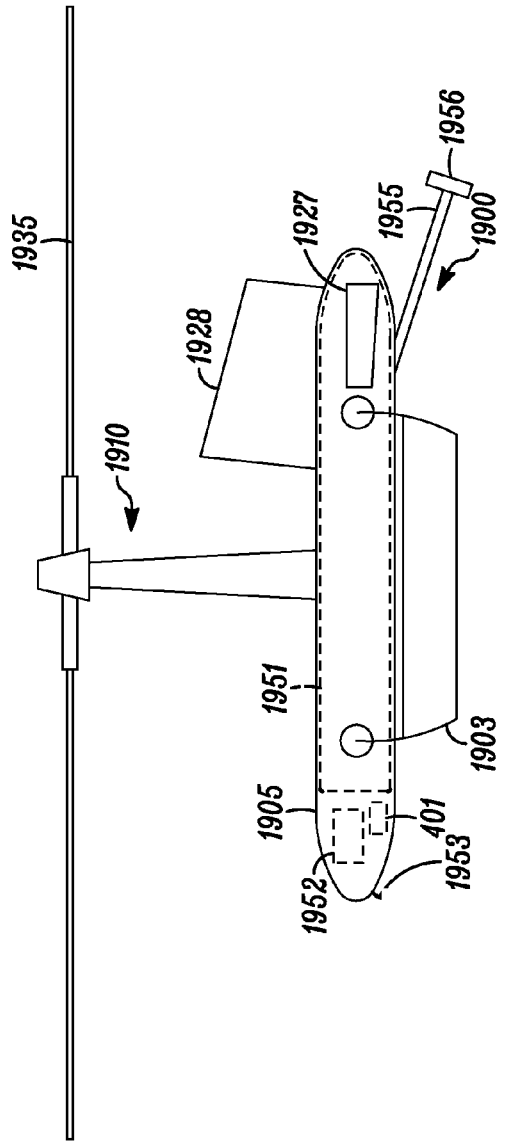
FIG. 20 is a side view of an aerovehicle with a liquid tank according an example of the present invention.

FIGS. 19-20 respectively show a top view and a side view of an aerovehicle 1900 including aerial refueling capability. Aerial refueling is sometimes referred to as air refueling, in-flight refueling, air-to-air refueling or tanking Aerial refueling includes transferring fuel from the aerovehicle 1900 to another aircraft during flight. In an example, the aerovehicle 1900, which is an autogyro and does not carry a pilot, refuels the tug aircraft (not pictured in FIGS. 19-20). In another example, the aerovehicle 1900 can refuel a different aircraft. As a result the aircraft being refueled can remain airborne longer and, at times more importantly, extend its range. In military applications, this will increase the weight of weapons that can be carried by the refueled aircraft as well as increase the time or distance of deployment of the refueled aircraft. Additional benefits to the aerovehicle acting as an aerial refueling vehicle include maximizing take-off cargo weight when the refueled aircraft carries less fuel at takeoff and then is topped up in the air. A further benefit is a shorter take-off roll for the refueled aircraft.

The aerovehicle 1900 includes a body 1905 on an undercarriage 1903. The body and the undercarriage can include components described herein. The aerovehicle body 1905 encloses a hollow interior and can house the controller 401. The numbering with reference to FIGS. 19-20 generally uses the prefix 19 and the two least significant digits are the same as corresponding elements from prior examples if like components exist in earlier examples. The body 1905 has a streamlined shape with regard to the forward flight direction (left in FIGS. 19 and 20) with the width being significantly less than the length. The forward and aft ends of the body are rounded. A single vertical stabilizer 1928 rises upwardly from the body 1905 to a height that will not be contacted by the rotary wings 1935, which can flex in some examples, of the autogyro assembly 1910. Horizontal stabilizers 1927 extend outward from the sides of the body 1905. These stabilizers 1927 and 1928 can include control surfaces that are controlled by the controller 401. A connection point is provided that can be connected the unmanned aerovehicle 1900 to a tug aircraft.

A fuel bladder 1951 is housed entirely within the body 1905 and takes most of the interior volume of the body. The bladder 1951 is an insert, with respect to the fuel to be carried, rubber or other polymer body. Inlet and outlet ports are positioned in the bladder 1951 to allow filling and discharge of fuel. The aerovehicle 1900 further includes a pump system 1952. Pump system 1952 can interface with the inlet/outlet ports in the bladder to control fuel from to or from the bladder 1951. The controller 401 can operate the pump system 1952 include a pump and air ports and liquid fuel ports. The pump system 1952 is connected to at least one of the aerial fuel transfer structure, 1953 and 1955. Aerial fuel transfer structure 1953 is connected to or integral with the tow line connected to the tug vehicle. Aerial fuel transfer structure 1953 can continuously refuel the tug vehicle.

Aerial fuel transfer structure 1955 can be either a probe and drogue component or a flying boom component. In the flying boom example an operator and specially designed receiving receptacle in the refueled aircraft are required. The flying boom is attached to the rear of the body 1905. The flying boom is articulated to allow boom movement up to about 25 degrees left or right, and from flush with the bottom of the body 1905 up to about 50 degrees below horizontal. A rigid fuel tube is positioned in an outer structural portion. A nozzle 1956 to the free end of the flying boom structure 1955. The nozzle 1956 can be mounted on a flexible ball joint. The nozzle mates to a fuel receptacle in the receiving aircraft during fuel transfer. A poppet valve in the end of the nozzle prevents fuel from exiting the tube until the nozzle properly mates with the receiver's refueling receptacle. When the nozzle 1956 is properly connected to the receptacle in the aircraft to be fueled, locks the nozzle to the receptacle. During the approach procedure, the flying boom must be moved to connect to the receptacle. In an example, a homing signal can be determined by the controller 401 which can control activators (hydraulic) that move the flying boom structure such that nozzle 1956 mates with the receptacle of the refueled aircraft. In another example, the imaging devices can be positioned on either the body 1905 or at the end of the nozzle 1956 to image the position of the nozzle and the receptacle. This image can be sent back to the controller 401, which can further send the image to a remote controller. The remote controller can then send control signals to controller 401 to position the nozzle 1956 for mating to the receptacle.

In will be appreciated that the structure 1955 can include a boom and aerodynamic control surfaces allowing precise three dimensional positioning (left/right and up/down) of the nozzle end of the boom. In an example, these control surfaces are ruddevators and provide functionality similar to tail-mounted rudder and elevator control surfaces of an airplane.

The controller 401 can communicate with fuel sensors that can sense the level of fuel in the bladder 1905 and can sense leaks when the fuel sensors indicate a lowering of the fuel in the bladder 1905 absent a signal from the tug aircraft that fuel transfer is to occur.

The aerovehicle as described herein includes an autogyro assembly that provides for stable low velocity flight. As the rotating airfoil blades provide lift and stability, the aerovehicle does not require roll controls.

The aerovehicle 100, 1000, or 1500 can be used in delivery, military, emergency, and agriculture uses. Agriculture uses can include aerial seeding or aerial spraying. Seed release mechanisms or sprayers can be mounted to the containers 105 or to a container mounted to the frame 1511. The on-board controller can control operation of the seed release mechanisms or sprayers. The agricultural uses can further delivery feed to animals. A drop mechanism can be mounted to the containers 105 or to a container mounted to the frame 1511. The drop mechanism can drop an entire load or can drop single units, such as single bales of hay. The on-board controller can control operation of the seed release mechanisms, sprayers, or the drop mechanism.

The present aerovehicle is to be compatible with unmanned aircraft system ("UAS") of the U.S. Department of Defense or the Federal Aviation Authority. The military role of unmanned aircraft systems is growing at unprecedented rates. Unmanned aircraft have flow numerous flight hours as either drones controlled from a remote location or as autonomous aircraft. The present aerovehicle can be part of a UAS that performs intelligence gathering, surveillance, reconnaissance missions, electronic attack, strike missions, suppression and/or destruction of enemy air defense, network node or communications relay, combat search and rescue, and derivations of these themes.

The aerovehicle as described herein can operate on the principal of the autogyro and takes advantage of two features of thereof, namely, a reduced takeoff and landing area relative to a powered airplanes and, second, its low speed and high speed flight characteristics. In an example, the aerovehicle as described herein can take off in little as zero feet of runway and in other examples, in less than 50 feet of runway. In an example, the aerovehicle as described herein can land in under twenty feet. Another feature of the aerovehicle is its ability to fly slow and not stall. When the aerovehicle stops its forward motion it slowly settles to the ground as the rotary wing will continue to rotate and create some lift as the aerovehicle settles. In an example, the aerovehicle can fly at speeds as low as 15 mph. This is based on the aerovehicle developing lift with its spinning rotor hub blades. As a result the aerovehicle has a larger speed envelope. Moreover, the vehicle is capable of flying in a greater range of speeds than airplanes.

The aerovehicle has the advantage of flying at a low speed without a stall. The result of slowing of the aerovehicle down too much is just that the aircraft will descend gently. Accordingly, the present aerovehicle has a major advantage over airplanes and helicopters-safety in event of an engine failure.

While some may think of an autogyro aerovehicle as described herein to be similar to a helicopter as they may be somewhat similar in appearance as they both rotate blades. However, the autogyro aerovehicle provides lift similar to an airplane and does not merely push air downwardly to provide lift. The autogyro aerovehicle can provide greater cargo carrying capacity in exchange for some reduction in maneuverability. Moreover, the autogyro aerovehicle has a less complex control system and powerplant than a helicopter. The autogyro aerovehicle as described herein produces less vibration and less electromagnetic interference than a helicopter.

The aerovehicle can be used in remote areas, like those in Alaska, Canada, Philippines, and South America. The aerovehicle can be used to provide supplies, and even fishing boats, to lodges and to remote locations. Oil and gas exploration and pipeline operations can be supported by aerovehicle delivery. Other applications include mail and parcel delivery, disaster relief, and emergency medical and survival supply delivery. The container of the aerovehicle can be modified to hold liquids from fire prevention and can act as a water bombing device.

The aerovehicle further can reduce the likelihood of some of the hazards of military cargo transport by avoiding ground delivery. Moreover, the aerovehicle increases the capacity of each flight resulting in fewer flights required to deliver the same amount of cargo. Moreover, the aerovehicle can deliver cargo where needed without landing the towing vehicle. This is safer for the pilot and ground transport team. The pilot need not land in a hazardous area. The ground transport team need not take the same roads from the airport to the locations where the equipment is staged or required. The aerovehicle can further be delivered in the event of brownouts by the use of helicopters, which do not require the electricity-based assistance that many planes require. The aerovehicles can be used to stage a forward aerial refueling point. In an example, one aerovehicle can include pumping equipment and any number of tanker vehicles can be landed near the pumping vehicle to provide the refueling point.

The aerovehicle further provides "green" benefits of reduced fuel consumption and the exhaust products by reducing either the size of the aircraft used to carry a same load or the reduction in the number of trips required to transport a same amount of cargo. In some examples, the aerovehicle can reduce fuel use by above 50% for the same amount of cargo. In certain applications of the aerovehicle 1500, fuel use can be reduced in a range of 70% to 90%. One measure of fuel use is the tonnage of cargo delivered per certain amount of fuel. In some applications of the aerovehicle 1500, the number of trips required by an aircraft is reduced by 75%.

It will further be noted that the aerovehicle is adaptable to any flying craft. As a result, aircraft that are not typically thought of as cargo craft can be used as cargo craft. In an example, a Scout-Attack Helicopter can deliver cargo by towing an aerovehicle as described herein. Moreover, the helicopter can tow its own support equipment as it deploys.

Structures, methods and systems for a towable, unmanned flying vehicle are described herein. Although the present invention is described with reference to specific example embodiments, it will be evident that various modifications and changes may be made to these embodiments without departing from the broader spirit and scope of the invention.

Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

We claim:

1. An aerovehicle system, comprising:
   a towing vehicle;
   a towed aerovehicle; and
   a tow line releaseably connected between the towing vehicle and towed aerovehicle, the towed aerovehicle including;
   a frame;
   a plurality of autogyro assemblies connected to the frame; and
   a controller to control operation of the plurality of autogyro assemblies for unmanned flight;
   wherein, when the controller determines a stall in the towing vehicle, the controller automatically releases the tow line and controls the flight of the towed aerovehicle to a landing by substantially following a flight path determined by sensed signals.

2. The aerovehicle system of claim 1, wherein each of the plurality of autogyro assemblies comprises a mast extending from the frame, a rotatable hub on an end of the mast, and a plurality of airfoil blades connected to the hub.

3. The aerovehicle system of claim 2, wherein each of the plurality of autogyro assemblies comprise a motor to rotate the blades prior to lift off to assist in take off, and wherein the motor does not have enough power to lift the frame from the ground.

4. The aerovehicle system of claim 3, wherein the controller senses forward motion to control the plurality of autogyro assemblies.

5. The aerovehicle system of claim 4, wherein the controller receives one or more signals from a propulsion device and controls the plurality of autogyro assemblies using the received one or more signals.

6. The aerovehicle system of claim 5, wherein the controller controls the rotational speed of the hub.

7. The aerovehicle system of claim 2, wherein the plurality of autogyro assemblies comprises actuators to control angle of the plurality of airfoil blades, and wherein the controller controls the actuators.

8. The aerovehicle system of claim 1, wherein the frame comprises an enclosure to hold cargo, a rear stabilizer, and an undercarriage to support the cargo enclosure when on the ground.

9. The aerovehicle system of claim 8, wherein the undercarriage includes a trolley that contacts the ground to provide mobility and is removable from the container.

10. The aerovehicle system of claim 1, wherein the controller issues control signals to position airfoil blades for different stages of flight.

11. The aerovehicle system of claim 10, wherein the controller is issues a flight control signal to set the airfoil blades for flight.

12. The aerovehicle system of claim 11, wherein the controller issues a takeoff control signal to set the airfoil blades for takeoff, wherein the angle of incidence of the airfoil blades is greater at takeoff than at flight.

13. The aerovehicle system of claim 12, wherein the controller issues a prerotation control signal to set the airfoil blades for pre-takeoff, wherein the angle of incidence of the airfoil blades is greater at takeoff and flight than at prerotation.

14. The aerovehicle system of claim 13, wherein the controller is issues a landing control signal to set the airfoil blades for landing, wherein the angle of incidence of the airfoil blades is greatest at landing.

15. The aerovehicle system of claim 1, wherein the controller controls a propulsion system that has sufficient thrust to assist in a cargo laden flight and an essentially cargo-free flight and does not have enough thrust to fly a frame supporting cargo.

16. The aerovehicle system of claim 1, wherein the tow line includes a mechanical component to transfer trust from a towing aircraft to the frame and an electrical component that transfers electrical signals from the towing aircraft to the controller.

17. The aerovehicle system of claim 1, wherein the controller receives signals from other controllers of nearby aerovehicles.

18. The aerovehicle system of claim 1, wherein the frame includes a moveable vertical stabilizer.

19. The aerovehicle system of claim 18, wherein the frame includes at least one horizontal stabilizer.

20. The aerovehicle system of claim 1, wherein the frame includes a first wing extending outwardly of an intermediate portion of the frame in a first direction and a second wing extending outwardly from the intermediate portion of the frame in a second direction.

21. The aerovehicle system of claim 1, wherein the frame includes a liquid tank.

22. The aerovehicle system of claim 21, wherein the liquid tank provides in-flight refueling to an aircraft.

23. The aerovehicle system of claim 22, wherein the liquid tank includes a flying boom and nozzle for releasing the liquid from the tank.

24. The aerovehicle system of claim 1, further comprising a propulsion system in contact with one or more of the frame and plurality of autogyro assemblies.

25. The aerovehicle system of claim 24, wherein the propulsion system includes an on-board motor, a drive shaft connected to the motor and extending outside the frame, and a propeller connected to the drive shaft.

* * * * *